United States Patent
Nymand

(10) Patent No.: US 12,355,343 B2
(45) Date of Patent: Jul. 8, 2025

(54) SOFT-SWITCHING PULSE-WIDTH MODULATED DC-DC POWER CONVERTER

(71) Applicant: SYDDANSK UNIVERSITET, Odense M (DK)

(72) Inventor: Morten Nymand, Odense M (DK)

(73) Assignee: SYDDANSK UNIVERSITET, Odense M (DK)

( * ) Notice: Subject to any disclaimer, the term of this patent is extended or adjusted under 35 U.S.C. 154(b) by 328 days.

(21) Appl. No.: 18/001,528

(22) PCT Filed: Jun. 22, 2021

(86) PCT No.: PCT/EP2021/066965
§ 371 (c)(1),
(2) Date: Dec. 12, 2022

(87) PCT Pub. No.: WO2021/259918
PCT Pub. Date: Dec. 30, 2021

(65) Prior Publication Data
US 2023/0253885 A1    Aug. 10, 2023

(30) Foreign Application Priority Data

Jun. 23, 2020 (EP) .................................. 20181543

(51) Int. Cl.
*H02M 1/34* (2007.01)
*H02M 1/00* (2006.01)
(Continued)

(52) U.S. Cl.
CPC ......... *H02M 1/342* (2021.05); *H02M 1/0048* (2021.05); *H02M 1/143* (2013.01);
(Continued)

(58) Field of Classification Search
CPC ............. H02M 1/0048; H02M 1/0058; H02M 1/14–15; H02M 1/34–348; H02M 3/01; H02M 3/155–1588; H02M 3/335–33592
See application file for complete search history.

(56) References Cited

U.S. PATENT DOCUMENTS 5,898,581 A  *  4/1999  Liu ................... H02M 3/33576
                                                       363/53
6,191,957 B1 *  2/2001  Peterson ........... H02M 3/33507
                                                       363/17
(Continued)

OTHER PUBLICATIONS

International Preliminary Report on Patentability (Chapter I) in PCT/EP2021/066965, Dec. 13, 2022. Obtained from https://www.wipo.int/patentscope/en/ on Jan. 15, 2025. (Year: 2022).*
(Continued)

*Primary Examiner* — Fred E Finch, III
(74) *Attorney, Agent, or Firm* — Crowell & Moring LLP; John C. Freeman

(57) ABSTRACT

A switch-mode DC-DC power converter including an input port and an output port, wherein the switch-mode DC-DC power converter includes a hard-switching circuit. The switch-mode DC-DC power converter further includes a first capacitance, a first inductance and a soft-switching circuit. The first capacitance is coupled in parallel across one of input and output ports at one side of the hard-switching circuit whereas the first inductance is coupled in series with another of the input and output ports and the hard-switching circuit at a second side of the hard-switching circuit opposite the first capacitance. A soft-switching circuit includes a second capacitance, a second inductance, a first rectifying element and a controlled discharger. The first rectifying element is coupled to the second inductance and the second capacitance. The controlled discharger is coupled to the second capacitance.

36 Claims, 12 Drawing Sheets

(51) Int. Cl.
*H02M 1/14* (2006.01)
*H02M 3/158* (2006.01)
*H02M 3/335* (2006.01)

(52) U.S. Cl.
CPC ........ *H02M 3/158* (2013.01); *H02M 3/33569* (2013.01); *H02M 3/33576* (2013.01); *H02M 3/33584* (2013.01)

(56) References Cited

U.S. PATENT DOCUMENTS

| | | | |
|---|---|---|---|
| 6,452,815 B1 | 9/2002 | Zhu et al. | |
| 7,859,870 B1 | 12/2010 | Schutten et al. | |
| 2005/0226012 A1* | 10/2005 | Jovanovic | H02M 3/156 363/59 |
| 2013/0027984 A1 | 1/2013 | Takegami | |
| 2019/0199241 A1* | 6/2019 | Murakami | F02P 3/01 |
| 2019/0245455 A1 | 8/2019 | Gudino Carrizales | |
| 2022/0181985 A1* | 6/2022 | Asanuma | H02M 7/5387 |

OTHER PUBLICATIONS

Chen C.-L. et al., "Passive lossless snubbers for DC/DC converters", IEE Proceedings: Circuits Devices and Systems, Institution of Electrical Engineers, Stenvenage., GB, vol. 145, No. 6, Dec. 2, 1998, pp. 396-401, NPL reference No. XP006010800; ISSN: 1350-2409; DOI: https://dx.doi.org/10.1049/ip-cds:19981877.

Ramachandran Rakesh et. al., "An energy recovery clamp circuit for an isolated DC-DC GaN converter", 2016 IEEE International Telecommunications Energy Conference (INTELEC), Oct. 23, 2016, IEEE, pp. 1-5; NPL reference No. XP033009641; DOI: https://dx.doi.org/10.1109/INTELEC.2016.7749095.

PCT/EP2021/066965 International Search Report (4 pages) dated Aug. 27, 2021.

PCT/EP2021/066965 Written Opinion of the International Searching Authority (8 pages) dated Aug. 27, 2021.

Extended European Search Report (8 pages) dated Nov. 24, 2020 out of corresponding European Application No. 20181543.8.

* cited by examiner

SOFT-SWITCHING PULSE-WIDTH MODULATED DC-DC POWER CONVERTER

This application is a National Stage application of International Application No. PCT/EP2021/066965, filed Jun. 22, 2021, the entire contents of which are incorporated herein by reference.

This application claims priority under 35 U.S.C. § 119(a) to European Patent Application No. 20181543.8, filed on Jun. 23, 2020, the entire contents of each of which are incorporated herein by reference.

BACKGROUND OF THE INVENTION

Technical Field

The invention relates to a switch-mode DC-DC power converter including a soft-switching circuit coupled to a hard-switching circuit configured to alternate between switching modes and comprising a plurality of semiconducting devices.

Description of the Related Art

Switch mode DC-DC power converters are ubiquitous in electrical power systems and energy storage applications, where a direct current (DC) electrical power source must be converted from one voltage level to another before the electrical power can be applied to a load, a rechargeable battery or the like. Typically, an electrical power source may be available in another form which is incompatible with the desired use, e.g. from a photovoltaic system, a battery cell or as alternating current (AC) source provided through the electrical grid but requiring AC-DC conversion via a rectifier. In many use cases, it is desirable to provide a large amount of electrical power, e.g. at least 1 kW, at a specific DC output voltage level using DC-DC or AC-DC conversion.

For example, due to the rising popularity of electric vehicles with battery packs that exceed 50 kWh in energy storage capacity, there is high demand for faster charging solutions that offer more than 50 kW direct current connections at consumer levels. Because delivered electrical energy is often sold as a commodity, e.g. at prices of about € 0.1-0.5 per kWh, the conversion efficiency may be a competitive parameter. Additionally, energy losses in DC-DC power converters for converting a high-power DC voltage may greatly affect thermal dissipation requirements, resulting in higher design complexity and costlier circuit components to compensate for this. A similar consideration arises within the renewable energy segment, where improved energy efficiency may help to reduce $CO_2$ emissions, energy tariffs and/or resource usage.

After the invention of metal-oxide semiconductor field effect transistors (MOSFETs) in 1959, modern switching regulators based on semiconductor technology replaced electromechanical voltage regulators due to advantages of electronically switching. Linear regulators and passive regulators remain in use for certain applications, such as converting between 3.3V, 5V or 12V DC voltage levels, but are not suited for DC-DC power converters delivering large amounts of electrical power because of their energy efficiency being limited by the input to output voltage conversion ratio.

Switch-mode power converters are predominantly used to convert electrical power efficiently in such cases, where using semiconducting devices, such as MOSFETs, to facilitate ultrafast switching between conductive and non-conductive states allows for minimal time spent in high-dissipation transition states to "turn on" and "turn off". Using pulse-width modulation (PWM), hard-switching a power converter in this way may produce a set point voltage substantially below or above the input voltage level. The voltage regulation is controllable by varying the duty cycle determined as a ratio between the pulse width representing the duration of the active or "on" state relative to the pulse repetition interval T, which offers good dynamic control e.g. in response to changes in load and negligible power dissipation when in either "on" or "off" state. However, to allow for using small and lightweight magnetic components, particularly in isolated switch-mode DC-DC power converters, it is desirable to switch frequently, which may involve pulse repetition frequencies T above 25 kHz, thereby introducing a considerable amount of switching loss due to charging and discharging of parasitic capacitances in circuit components, such as inductive or ferromagnetic components, reverse recovery losses in semiconducting switches, diodes, transistors and the like.

Various implementations exist of DC-DC power converts aimed towards improving conversion performance of hard-switching and phase-shifted power converters alike, to provide higher conversion efficiency, ideally greater than 95%, at reduced overall costs, weight and size. For example, US 2019/0245455 A1 (Robert Busch GmbH) discloses a DC-DC power converter using a phase-shifted full bridge configuration with reduced power losses for isolated energy transfer between a low-voltage side and a high-voltage side in an electric or hybrid vehicle operating at several 100V.

However, despite of all these measures provided, problems still exists for improving conversion performance, and in particular with respect to increasing power density, which expresses the rated electrical power per unit volume of the power converter. Thus, it remains a problem to improve the conversion performance of switch-mode DC-DC power converters for delivering large amounts of electrical power in a cheap, simple and reliable manner with the highest possible power density.

SUMMARY

Disclosed herein is, in a first aspect of the present disclosure, a switch-mode DC-DC power converter including:
- at least two power ports including an input port and an output port,
- a hard-switching circuit including a plurality of semiconducting devices including at least a first switching element, the hard-switching circuit configured to receive a DC voltage source at an input side and to provide a substantially rectified output at an output side,
- a first capacitance coupled in parallel across one of the at least two power ports at one side of the hard-switching circuit,
- a first inductance coupled in series with another of the at least two power ports and the hard-switching circuit at a second side of the hard-switching circuit opposite the first capacitance,
- a soft-switching circuit including:
    - a second capacitance;
    - a second inductance coupled to the first capacitance and to at least one of the plurality of semiconducting devices;
    - a first rectifying element coupled to the second inductance and the second capacitance to charge the second capacitance by forward biasing the first rectifying element based on an induced voltage across the second inductance in response to the hard-switching circuit transitioning from one mode to another mode; and a controlled discharger coupled to the second capacitance to reduce a voltage across the second capacitance towards a voltage level substantially above the voltage across the first capacitance.

The power converter provides that a direct current (DC) electrical power source may be converted from one voltage level to another. Hereby, the electrical power which is delivered through the power converter can be applied to a load, a rechargeable battery or the like. The power converter is a switch-mode DC-DC power converter, which converts said electrical power by alternating between switching modes. It is understood that a DC electrical power source may be a voltage source providing a unidirectional flow of electric charge at a constant or nearly-constant voltage.

The switch-mode DC-DC power converter includes at least two power ports. The at least two power ports includes an input port and an output port. Hereby a DC voltage source can be coupled to an input port, and the power converter can then provide a DC voltage supply at the output port by converting a DC input voltage level of the DC voltage source to a DC output voltage level provided at the output port. The power converter may thus provide DC output voltage levels according to a predetermined set point voltage considerably below or above the input voltage level.

The hard-switching circuit includes a plurality of semiconducting devices including at least a first switching element. The hard-switching circuit is configured to receive a DC voltage source at an input side. The input side of the hard-switching circuit may include two voltage terminals across which DC or DC-like voltages can be applied to thereby provide input power to the hard-switching circuit. Then, the hard-switching circuit is configured to convert DC electrical power from one voltage level to another by repeatedly alternating between two or more modes of the hard-switching circuit. Thus, the hard-switching circuit has an input side for receiving a source of electrical power at one DC or DC-like voltage level and an output side for providing a supply of electrical power at another DC or DC-like voltage level. The output side of the hard-switching circuit may comprise two current terminals across which DC or DC-like current can be provided to thereby deliver output power to a load coupled to the output port of the power converter. The hard-switching circuit may be configured to provide a substantially rectified output at an output side. The substantially rectified output may be a current which is carried in one direction along a forward path from one of the two current terminals to one of the two output terminals of the output port, across a load coupled to the output port and back along a return path from another of the two output terminals of the output port to another of the two current terminals. It is understood that by the hard-switching circuit being configured to receive a DC voltage source at an input side, the hard-switching circuit may also receive a DC-like voltage source which may also be a voltage source providing a unidirectional flow of electric charge but which is not applied as a constant DC input voltage. For example a DC-like voltage source may be provided by a low-impedance capacitance, which may provide a unidirectional flow of electric charge during discharge but wherein the voltage across said low-impedance capacitance may drop as its charge is depleted. Thus, the hard-switching circuit is not configured to receive a DC voltage source if electrical power cannot be continually or at least semi-continually delivered from an input side to an output side through the hard-switching circuit, such as would be the cased if, e.g., the input side were only connectable to the DC voltage source through a high-pass filter, a series capacitance, an AC-DC converter or entirely galvanically separated. It is understood that the power converter must be delivering an electrical power continually or at least semi-continually from the input side to the output side in order to suitably power a load, a rechargeable battery or the like.

Generally, the hard-switching circuit provides the DC-DC power conversion for the power converter between the at least two power ports, such as by converting a DC voltage applied at the input port, via the input side, the plurality of semiconducting devices including at least one switching element and the output side, to another DC voltage supplied at the output port to a load, a rechargeable battery or the like. The hard-switching circuit may be configured to provide a substantially rectified output at an output side by repeatedly alternating between two or more switching modes.

Using pulse-width modulation (PWM), configuring the hard-switching circuit in this way may produce a set point voltage considerably below or above the input voltage level. Thus, the hard-switching circuit may provide voltage regulation between the input side and the output side using PWM methods. The voltage regulation may be controllable by varying the duty cycle determined as a ratio between the pulse width representing the duration of the active or "on" state relative to the pulse repetition interval T, which offers good dynamic control e.g. in response to changes in load and negligible power dissipation when in either "on" or "off" state.

The power converter includes a first capacitance coupled in parallel across one of the at least two power ports. The first capacitance may be coupled in parallel across the input port. Hereby, an electrical energy reservoir with a low impedance may be provided at the input side of the hard-switching circuit, to be utilized for temporarily storing or recovering electrical energy during operation of the hard-switching circuit. Alternatively or additionally, the first capacitance may be coupled in parallel across the output port. Hereby, an electrical energy reservoir with a low impedance may be provided at the output side of the hard-switching circuit, to be utilized for temporarily storing or recovering electrical energy during operation of the hard-switching circuit. The first capacitance may further provide a filtering or smoothing effect on a DC or DC-like voltage received or supplied at the input port or output port, respectively. The first capacitance may include one or more capacitive components, such as a ceramic capacitor, an electrolytic capacitor, a multilayer film capacitor or the like.

In some embodiments, the first capacitance is coupled in parallel across one of the at least two power ports at one side of the hard-switching circuit, such as across the input port at the input side of the hard-switching circuit, such as across the output port at the output side of the hard-switching circuit.

In some embodiments, the hard-switching circuit has one side and a second side. It is understood that which of the one side and the second side correspond to the input side and the output side may depend on the direction the power converter operates.

The one side may be the input side or the output side and the second side may be the output side or the input side, respectively. Typically, for providing a lowered DC voltage supply, the one side is the input side and the second side is the output side.

In some embodiments, one side of the hard-switching circuit is the input side of the hard-switching circuit and a second side of the hard-switching circuit is the output side of the hard-switching circuit. In other embodiments, the one side of the hard-switching circuit is the output side of the hard-switching circuit and the second side of the hard-switching circuit is the input side of the hard-switching circuit.

The power converter includes a first inductance. The first inductance is coupled in series with another of the at least two power ports and the hard-switching circuit at a second side of the hard-switching circuit opposite the first capacitance. The first inductance may include one or more inductive components, such as an inductor, a coil, a choke, a reactor or the like. The one or more inductive components may be a plurality of inductive components coupled in series or in parallel to one another.

In some embodiments, the at least two power ports is two power ports including the input port and the output port. Each of the two power ports may be the input port or the output port according to the direction which the power converter operates as also discussed above in relation to the one side and the second side. One of the at least two power ports may be the input port or the output port and another of the at least two power ports may be the output port or the input port, respectively. Usually, for providing a lowered DC voltage supply, the one of the at least two power ports is the input port and the another of the at least two power ports is the output port.

In some embodiments, the first inductance is coupled in series with another of the at least two power ports. The first inductance may be coupled in series with another of the at least two power ports by being coupled in series with the output port. Hereby, an electromotive force (EMF) induced by a time-varying magnetic field at the first inductor may be provided to the power port by temporarily increasing or decreasing the voltage across the first inductor in response to rapid changes in current flowing through the first inductor. By applying a voltage signal in the form of a square wave waveform across the first inductor, i.e., alternating between a substantially constant positive voltage and a substantially constant negative voltage at repeating intervals, the first inductor may enable that a current is carried in one direction through the first inductance in the form of a ripple current with a substantially constant rate of current increase and decrease over time, respectively, within said repeating intervals. Thus, the first inductance may provide that a forward current is driven in the direction from the input port to the output port, i.e., aligned with a forward direction of power being delivered from one of the at least to power ports to another of the at least two power ports when the switch-mode DC-DC power converter is in operation. Moreover, the first inductance may be coupled in series with the output port and the hard-switching circuit at the output side of the hard-switching circuit opposite the first capacitance. Thus, the first inductor may provide a current stabilizing effect at the output port to allow the hard-switching circuit to supply a DC or DC-like output voltage based on a filtered or smoothed substantially rectified output provided at the output side.

In another aspect, the first inductance may be coupled in series with another of the at least two power ports by being coupled in series with the input port. Hereby, an EMF induced by a time-varying magnetic field at the first inductor may be provided at the input port by temporarily increasing or decreasing the voltage across the first inductor in response to rapid changes in current flowing through the first inductor.

Further, the first inductance may be coupled in series with the input port and the hard-switching circuit at the input side of the hard-switching circuit opposite the first capacitance. Thus, the first inductor may provide a current driving effect at the input port to allow the hard-switching circuit to receive a DC voltage source at the input side from which to draw and sustain a large current by temporarily opening or closing at least the first switching element and to thereby provide an elevated DC voltage at the output port relative thereto via the substantially rectified output.

In some embodiments, the first capacitance is coupled in parallel across one of the two power ports at one side of the hard-switching circuit, and the first inductance is coupled in series with another of the two power ports and the hard-switching circuit at a second side of the hard-switching circuit opposite the first capacitance. Further, the one of the two power ports may be the input port and the another of the two power ports may be the output port. Hereby, the power converter may be in step-down or "buck" configuration. Alternatively or additionally, the one of the two power ports may be the output port and the another of the two power ports may be the input port. Hereby, the power converter may be in step-up or "boost" configuration.

The switch-mode DC-DC power converter includes a soft-switching circuit. The soft-switching circuit includes a second capacitance, a second inductance, a first rectifying element and a controlled discharger. In some embodiments, the controlled discharger comprises one or more additional semiconducting devices, which may include at least one additional switching element. Hereby, the soft-switching circuit and the hard-switching circuit may operate by applying different switching methods. It is understood that the soft-switching circuit is coupled to the first capacitance and to one side of the hard-switching circuit, i.e. electrically connected therein between.

The terms "hard switching" and "soft switching" refer to the methods of switching based on the relationship of current and voltage during the turn-on and turn-off of the at least one switching element, such as a MOSFET, an insulated-gate bipolar transistor (IGBT) or the like. Hard switching is a switching method that utilizes the ability of the semiconducting device, such as a power semiconducting device used as a switch or rectifier in power electronics, to transition or "hard switch" very rapidly and abruptly between a conducting state of being closing or "on" and a substantially non-conducting state of being opening or "off". Typically, such power semiconductor device are used in "commutation mode" (i.e. predominantly either in the "on" or "off" state), and by design optimized for that usage, so are not suited for linear operation. Hence, the hard-switching circuit comprising a plurality of semiconducting devices including at least a first switching element is understood as a power electronic circuit configured for receiving a DC voltage source and providing a substantially rectified output by converting electrical power from one voltage level to another by applying a hard-switching method of operating said plurality of semiconducting devices. Hard switching is typically used for simple switches, motor drive inverters and switched-mode power supply (SMPS) applications where low conduction losses are desired.

It is understood that during on-off transitions, both voltage and current are applied to the at least one switching element. When hard switching, the collector current and collector-emitter voltage change sharply, causing switching noise and losses. Hard switched power converters are generally simple, i.e. use few components, and have inherently low conduction losses. However, especially during turn-on, hard switched power converters thus encounter switching losses also due to charging the parasitic capacitances in other circuit components, such as other switching elements, diodes or magnetic components in the hard-switching circuit. Additionally, due to the hard-switching circuit including a plurality of semiconducting devices, severe turn-on losses from reverse recovery in diodes, intrinsic body diodes or the like generally leads to unacceptably large energy losses in hard-switching switch-mode DC-DC power converters for converting high-power DC voltages, which is undesirable.

Conversely, a soft-switching circuit uses an LC resonant circuit to turn on and off at least one switching element at or near zero current or zero voltage. Ideally, timing of the voltage and current waveforms is controlled by altering the switching timing, i.e. when to transition between the on and off state of at least one switching element, in order to minimize the intersection of their waveforms to reduce or prevent switching losses. Soft switching helps to reduce switching noise and losses because switching devices turn on and off at zero or nearly zero voltage or current, however this comes at the expense of higher complexity of the design and/or higher conduction losses. The inventors have thus realized that, because such conduction losses are typically a dominant loss factor in power converters which are operating at maximum power, neglecting or "sacrificing" increases in conduction losses to achieve lower switching losses will generally lead to a more complex and expensive power converter design; particularly so when also striving to achieve improved power density.

Nonetheless, soft-switching DC-DC power converters have achieved a remarkable success in power electronics technology in terms of reduction in switching losses, improved power densities, minimization of electromagnetic interference (EMI) and reduction in the volume of DC-DC converters. The inventors have seen indications that DC-DC power converters according to the present disclosure may have a large potential to significantly improve DC-DC power converter performance in terms of both energy conversion efficiency and reduced cost and/or size by combining the methods of hard-switching and soft-switching. Thus, it is an advantage of a power converter according to the present disclose that low loss recovery of diodes and zero current turn-on of switching elements, such as MOSFETs, may be realized while retaining at least some of the fundamental advantages of hard-switched DC-DC power converters, e.g. the inherently low conduction losses associated with hard-switching converters. By placing a small clamped inductive element in series with the switching elements at the input side, or the so-called "voltage port", of a hard-switching circuit, e.g. coupled between a first low impedance input capacitance and a voltage port, the inventors have seen good indications that such a clamped inductive element helps to provide lossless or near-lossless charging of parasitic capacitances for power semiconducting devices and may reduce losses for reverse recovery in diodes, intrinsic body diodes or the like, as well as energy losses due to charging of parasitic capacitances, magnetic components and so forth. This solution has the advantage of being a relatively simple design, requiring only a soft-switching circuit to be added in conjunction with a hard-switching circuit, which retains the advantages of a hard-switching converter and improves its shortcomings.

The soft-switching circuit includes a second capacitance. Thereby, an auxiliary electrical energy reservoir with a moderately low impedance may be provided at the soft-switching circuit, e.g., to be utilized for temporarily storing or recovering electrical energy during operation of the soft-switching circuit. The soft-switching circuit further includes a controlled discharger coupled to said second capacitance. Hereby, any charge deposited at the second capacitance may be safely discharged at opportune moments, such as when the stored electrical energy can be recovered and put back into an energy deliver system comprising a DC voltage source, the switch-mode DC-DC power converter and a load, a rechargeable battery or the like. The second capacitance may include one or more capacitive components, such as a ceramic capacitor, an electrolytic capacitor, a multilayer film capacitor or the like.

The soft-switching circuit includes a second inductance. The second inductance is coupled to the first capacitance and to at least one of the plurality of semiconducting devices. The second inductance may be coupled in series with one terminal of the first capacitance and at least one of the plurality of semiconducting devices. Hereby, an additional electromotive force (EMF) induced by a time-varying magnetic field at the second inductor may be provided between the first capacitance and the at least one of the plurality of semiconducting devices, i.e., between the first capacitance and the one side of the hard-switching circuit, by temporarily increasing or decreasing an induced voltage across the second inductor in response to rapid changes in current flowing through the second inductor. Thus, the second inductance may provide current stabilizing or current driving effects at the one side of the hard-switching circuit to allow the soft-switching circuit to opportunistically charge and discharge the second the second capacitance at opportune moments, e.g., responsive to the hard-switching circuit transitioning from one mode to another mode thereby changing said current. The second inductance may include one or more inductive components, such as an inductor, a coil, a choke, a reactor, a pair of coupled inductors or the like. Having a first inductor and a second inductor provides a substantial cross-coupling.

In some embodiments, the first inductor and the second inductor are coupled in series between the input port and the output port through the hard-switching circuit. The first inductor and the second inductor may be coupled in series with each other through the hard-switching circuit by the first inductor being coupled between the input port and the input side of the hard-switching circuit, and the second inductor further being coupled between the output side of the hard-switching circuit and the output port. Alternatively, they may be coupled in series with each other through the hard-switching circuit by the first inductor being coupled between the output side of the hard-switching circuit and the output port, and the second inductor further being coupled between the input port and the input side of the hard-switching circuit. This may enable operating the switch-mode DC-DC power converter, by alternating the hard-switching circuit between modes, such that electrical energy may be stored or retrieved at both the input and output sides at different times, respectively, via their coupling through the hard-switching circuit, which may provide improved control of forward current flowing through the power converter, and/or specifically through the hard-switching circuit, when the hard-switching circuit alternates between modes.

In some embodiments, the hard-switching circuit is configured to alternate between modes. Each mode may include an opening state or a closing state of at least a first switching element. In some embodiments, alternating between modes of the hard-switching circuit includes changing at least a first switching element from an opening or "off" state to a closing or "on" state or vice versa. In some embodiments, a mode of the hard-switching circuit represents an opening state or closing state of each of the least a first switching element, so that each of the least a first switching element remains in or changes to a conduction state of either "on" or "off" for that switching element according to said mode. Thus, the hard-switching circuit may provide power conversion of electrical power from one DC voltage level to another DC voltage level by repeatedly alternating between modes, e.g. according to embodiments of a hard-switching DC-DC power converter disclosed herein or otherwise known in the art.

The soft-switching circuit includes a first rectifying element. The first rectifying element may be coupled to the second inductance. Hereby, an induced voltage across the second inductance, e.g., in response to rapid changes in current flowing through the second inductor, may be provided for forward biasing the first rectifying element so that a fraction of the current may be diverted through the first rectifying element. It is understood that the first rectifying element may thus act as a diode to conduct said current in only one direction through the first rectifying element. Thus, it is contemplated that, since only a fraction of the current through the second inductor is expected to be diverted through the first rectifying element in this way, the suitable choices for first rectifying element may include a diode or the like which are rated for much lower maximum voltages and/or currents, thereby allowing a cheaper design. It is understood that the first inductance and/or second inductance must typically be rated for considerable maximum currents, such as in excess of 100 A. It is likewise understood that the first capacitance and/or the second capacitance must typically be rated for considerable maximum voltage drops, such as in excess of 100V.

The first rectifying element may be coupled to the second capacitance. Hereby, the first rectifying element may be electrically connected to the second capacitance and the second inductance, such as by one terminal of the first rectifying element being coupled to one of the two components and another terminal of the first rectifying element being coupled to another of the two components.

In some embodiments, the second capacitance and the first rectifying element are arranged in series to each other. Further, the second capacitance and the first rectifying element, being arranged in series to each other, may be coupled to the second inductance. Thus, the first rectifying element may act as a diode to conduct current in only one direction from the second instance, through the first rectifying element and to the second capacitance. This further provides that the first rectifying element is coupled to charge the second capacitance by forward biasing the first rectifying element based on an induced voltage across the second inductance. It is advantageous that the second capacitance may be opportunistically charged and discharged at opportune moments e.g. responsive to the hard-switching circuit transitioning from one mode to another mode thereby changing said current.

In some embodiments, the first rectifying element is coupled to charge the second capacitance by forward biasing the first rectifying element based on an induced voltage across the second inductance. It is understood that a change in voltage across the second inductance may be induced, at least in part, in response to the hard-switching circuit transitioning from one mode to another mode. As discussed above, charging the second capacitance may include providing a clamped output to charge the second capacitance based on an induced voltage across the second inductance in response to the hard-switching circuit transitioning from one mode to another mode. The clamped output may be a positively clamped output, such as by conducting current in only one direction across the first rectifying element, wherein a clamped output is positively clamped via forward biasing the first rectifying element. The positively clamped output may provide that the second capacitance is charged to a clamp voltage level substantially above an input voltage level provided by a DC voltage source applied to one of the at least two power ports, such as the input port. Thus, the first rectifying element may be coupled to the second inductance and the second capacitance to charge the second capacitance by forward biasing the first rectifying element based on an induced voltage across the second inductance in a response to the hard-switching circuit transitioning from one mode to another mode.

In some embodiments, the hard-switching circuit transitioning from one mode to another mode includes the at least a first switching element of the hard-switching circuit changing from a substantially "off" or opening state to a substantially "on" or closing state. Alternatively or additionally, the hard-switching circuit transitioning from one mode to another mode may include the at least a first switching element of the hard-switching circuit changing from a substantially "on" or closing state to a substantially "off" or opening state. In yet further aspects, the induced voltage across the second inductance may be induced in response to hard-switching a controllable function of the hard-switching circuit, such as of the at least one switching elements.

The soft-switching circuit includes a controlled discharger. It is understood that the controlled discharger may controllably discharge an amount of charge accumulated on a capacitive component, such as the second capacitance, e.g., by depleting and transferring said amount of charge from second capacitance to another capacitive component, a resistive element, a current sink or the like. The controlled discharger is coupled to the second capacitance. By coupling the controlled discharger to the second capacitance, the controlled discharger provides that a voltage across the second capacitance may be reduced in a controlled and safe manner.

The controlled discharger may be coupled to the second capacitance to reduce a voltage across the second capacitance towards a voltage level, such as a constant voltage level, such as to a clamp voltage level substantially above an input voltage level provided by a DC voltage source applied to one of the at least two power ports, such as the input port. The controlled discharger may reduce a voltage across the second capacitance towards a voltage level substantially above the voltage across the first capacitance. Hereby, a differential voltage may be created and maintained between the first capacitance and the second capacitance, and a positive differential voltage may be utilized to deplete and transfer said charge to the first capacitance. The controlled discharger may be configured to receive and regulate a differential voltage between the first capacitance and the second capacitance. The controlled discharger may be configured to discharge the second capacitance based on the detected differential voltage exceeding a predetermined threshold voltage. Hereby, an amount of charge deposited to the second capacitance by forward biasing the first rectifying element is depleted, which may help recover otherwise lost energy, e.g. by depleting and transferring said charge to another capacitive component.

The controlled discharger may provide that a voltage across the second capacitance may be reduced in a controlled and safe manner, and its charge safely discharged at opportune moments, such as when the stored electrical energy can be recovered. The controlled discharger may be configured to activate either selectively, based on the differential voltage exceeding a predetermined threshold voltage, at windows of opportunity based on the mode of the hard-switching circuit, in synchronization with the hard-switching circuit transitioning from one mode to another mode or irregularly.

The controlled discharger may be coupled to the second capacitance to maintain a voltage drop across the second capacitance within a voltage range having a lower bound kept at a voltage level substantially above the voltage drop across the first capacitance, such as at least 5V above, such as between 25V and 100V above. This may allow forward biasing and reverse biasing of the first rectifying element in dependence of the sign and/or magnitude of the induced voltage across the second inductance in addition to the voltage drops across the first and second capacitance. Further, maintaining the voltage drop across the second capacitance within a limited voltage range may help to ensure that a maximum rated voltage of the first rectifying element and/or any of the plurality of semiconducting devices is not exceeded.

In some embodiments, the hard-switching circuit is configured to repeatedly alternate between modes. Each mode may include an opening state or a closing state of the at least a first switching element. The hard-switching circuit may be configured to alternate between at least one mode and another mode with a pulse repetition frequencies above 10 kHz, such as between 25 kHz and 50 MHz.

In some embodiments, the one side is a high-voltage side and the second side is a low-voltage side, wherein a voltage amplitude measured across the high-voltage side exceeds a voltage amplitude measured across the low-voltage side.

In some embodiments, the first capacitance is coupled in parallel across one of the two power ports at a high-voltage side of the hard-switching circuit, and the first inductance is coupled in series with another of the two power ports and the hard-switching circuit at a low-voltage side of the hard-switching circuit opposite the first capacitance. Further, the one of the two power ports may be the input port and the another of the two power ports may be the output port. Hereby, the power converter is in step-down or "buck" configuration. Alternatively or additionally, the one of the two power ports may be the output port and the another of the two power ports may be the input port. Hereby, the power converter is in step-up or "boost" configuration.

In some embodiments, the soft-switching circuit is connecting the first capacitance to the hard-switching circuit at the high-voltage side of the hard-switching circuit.

It is understood that the voltage amplitudes are to be measured when the power converter is in normal operation with the input port coupled to a DC voltage source. Further, the voltage amplitudes may be measured either as RMS voltage levels or by the average voltage observed over a period of time, respectively.

In some embodiments, current is carried in one direction through the first inductance and/or the second inductance. Current may be carried in a forward direction through the first inductance and/or the second inductance. The forward direction may be the direction from the input port to the output port, or more generally, the main direction of power delivery by the switch-mode DC-DC power converter when in operation.

In some embodiments, the second capacitance and the first rectifying element are arranged in series to each other and together coupled in parallel to the one side of the hard-switching circuit, such as by each end of the series arrangement being directly coupled to one or more of the plurality of semiconducting devices.

In some embodiments, the second capacitance and the first rectifying element are arranged in series to each other and arranged together in parallel to the one side of the hard-switching circuit so that a return path from the first input terminal to the second input terminal is provided through the second inductance, the first rectifying element and the second capacitance. Thus, an induced voltage across the second inductance may be provided additional charging of the second capacitance via the clamped output of the first rectifying element to a higher voltage level than provided by a DC voltage supply, e.g. at about the clamp voltage. Alternatively or additionally, electrical energy stored in the second capacitance in this way may be returned to the first capacitor at an opportune moment to thereby temporarily reduce the power consumption via the DC voltage supply keeping a fixed input voltage thereacross. It is contemplated that electrical energy stored in the second capacitance may also be returned in a continuous manner or directed towards another suitable purpose, e.g. for providing quiescent or shutdown current to switches to reduce idle energy draw.

In some embodiments, the second capacitance and the first rectifying element may be arranged in series to each other and may together be coupled in parallel to the second side of the hard-switching circuit.

In some embodiments, the controlled discharger is directly coupled to one terminal of the first capacitance and to a corresponding terminal of the second capacitance. Optionally, also to another terminal of the first capacitance, such as at a return path.

In some embodiments, the controlled discharger is a voltage regulating element configured to receive and regulate a differential voltage between the first capacitance and the second capacitance, said differential voltage being substantially less than an input voltage applied by the DC voltage source, such as less than half of the input voltage, such as less than a quarter of the input voltage.

The controlled discharger may be a voltage regulating element. The controlled discharger, e.g. in the form of a voltage regulating element, may be configured to receive and regulate a differential voltage between the first capacitance and the second capacitance. The controlled discharger may be configured to discharge the second capacitance e.g. based on the detected differential voltage exceeding a predetermined threshold voltage. Hereby, an amount of charge deposited to the second capacitance by forward biasing the first rectifying element is depleted.

In some embodiments, the voltage regulating element is coupled between the first capacitance and the second capacitance to discharge the second capacitance into the first capacitance.

In some embodiments, the hard-switching circuit further includes a current sensor configured for detecting a junction current through at least the first switching element and wherein the voltage regulating element is further configured to receive a sensor signal indicative of the junction current from the current sensor and to regulate the differential voltage based on the sensor signal.

In some embodiments, the controlled discharger is a DC-DC step-down converter.

The controlled discharger being a DC-DC step-down converter may provide that the controlled discharger acts as a voltage regulating element, which may be configured to receive and regulate a differential voltage between the first capacitance and the second capacitance, the differential voltage being substantially less than an input voltage applied by a DC voltage source to the input port of the power converter.

By the voltage regulating element being a DC-DC step-down converter, the soft-switching circuit provides that an electrical energy may be efficiently returned to the first capacitance from the second capacitance when the voltage across the second capacitance is somewhat greater that the voltage across the first capacitance, such as the by second capacitance being charged to 525V via an input voltage of 500V. In such an example, a relative low-voltage DC-DC step-down converter e.g. rated for an maximum DC input voltage of 40V may be suitable as the voltage regulating element because the differential voltage is only 25V. Further, since current through the voltage regulating element is only a fraction of the forward current through the hard-switching circuit, due to the first rectifying element providing a clamped output to charge the second capacitance, the DC-DC step-down converter need only be rated for an output current of about 2 A. It is understood that such low-voltage low-power DC-DC step-down converters may be commercially available with very high conversion efficiency, such as more that 95% efficiency, and that a DC-DC power converter according to the present disclosure may allow improving the conversion efficiency of high-power DC-DC converters e.g. through use thereof.

In some embodiments, the controlled discharger is a non-isolated switch-mode DC-DC step-down converter. It is an advantage of the power converter that a controlled discharger in the form of a DC-DC step-down converter does not need to be isolated even when the power converter itself is an isolated DC-DC power converter, as this does not compromise the isolation of the hard-switching circuit. It may be cheaper to design a highly efficient isolated DC-DC power converter according to embodiments of the present disclosure by choosing a non-isolated switch-mode DC-DC step-down converter for the controlled discharger, which may be cheaper and more efficient for that task than corresponding isolated DC-DC step-down converters. Moreover, such an isolated DC-DC power converter may allow for a design which provides improved energy conversion efficiency by incorporating another design of non-isolated switch-mode DC-DC power converters also having improved energy conversion efficiency.

It is contemplated that a suitable choice for the voltage regulating element may also include a voltage regulating subcircuit, e.g., including a step-down DC-DC switching regulator controller configured to drive one or more N-channel synchronous power MOSFET stages, such as, e.g., based on a LTC7810 switching regulator controller by Analog Devices or the like. Such a voltage regulating subcircuit may for example be constructed to act as a high-efficiency non-isolated switch-mode DC-DC step-down converter configured to receive a DC voltage level substantially less than the input voltage of the overall DC-DC power converter, such as less than half, based on the differential voltage between the first capacitance and the second capacitance. The LTC7810 is for example operable at a DC voltage level between 5V and 140V and thus allows for driving MOSFET stages of a voltage regulating subcircuit to deliver up to 10 A of current in a DC-DC step-down configuration with about 95% efficiency. It is contemplated that a voltage regulating subcircuit may further require a voltage reference point, e.g., ground, from which to regulate the differential voltage between the first capacitance and the second capacitance, which may need to be chosen in observance of the maximum rated voltage of said voltage regulating subcircuit. It is moreover contemplated that a ground pin of the voltage regulating subcircuit may be operated in floating mode, to thereby reduce the needed maximum voltage rating.

The inventors have seen indications that a DC-DC power converter according to the present disclosure may have an improved efficiency and/or reduced energy losses associated with semiconductor reverse recovery by embedding such a DC-DC step-down converter, wherein the differential voltage between the first capacitance and the second capacitance is between 5%-25%, such as approximately 10%, of the input voltage of the overall DC-DC power converter. It is understood that some loss may be allowed in the voltage regulating element while still achieving improvements in the overall losses associated with power conversion for the DC voltage supply.

In some embodiments, the voltage regulating element is an auxiliary resistive load arranged between the first capacitance and the second capacitance so that the differential voltage is regulated by drawing a current across said auxiliary resistive load. Drawing a current across the auxiliary resistive load converts electrical power to heat, which may then be effectively dissipated by the auxiliary resistive load. In some circumstances, it may be advantageous to get rid of excess electrical energy e.g. stored in the second capacitance to mitigate any negative consequences of an induced voltage across the second inductance and/or at the hard-switching circuit.

In some embodiments, the second capacitance charges to a second RMS voltage level substantially above a first RMS voltage level of the first capacitance through the first rectifying element, such as an RMS voltage level at least 10V above a DC input voltage provided at the input port, such as between 25V and 200V above.

In some embodiments, the hard-switching circuit includes two or more rectifying elements arranged into a rectifier subcircuit, such as a bridge rectifier subcircuit, such as in a half-bridge rectifier configuration, such as in a full-bridge rectifier configuration, such as a current-doubler rectifier subcircuit. Hereby, the hard-switching circuit is enabled to provide a substantially rectified output at the output side by the operation of the rectifier subcircuit.

In some embodiments, the plurality of semiconducting devices of the hard-switching circuit further include one or more rectifying elements coupled to the first inductance, such as two or more rectifying elements coupled to the first inductance.

It is to be understood that the one or more rectifying elements of the hard-switching circuit, the one or more rectifying elements directly coupled to the first inductance, may not include the first rectifying element of the soft-switching circuit, the first rectifying element coupled to the second inductance and the second capacitance.

In some embodiments, the hard-switching circuit includes a switching controller configured to selectively operate at least the first switching element to generate a pulse-width modulated output. The switching controller may provide a control signal representing a mode of the hard-switching circuit to the at least a first switching element, the mode including an opening state or a closing state of the at least a first switching element. Hereby, at least a first switching element may be controlled.

In some embodiments, the pulse-width modulated output is generated by time-proportioning a duty cycle of the at least a first switching element to supply a predetermined set point voltage.

In some embodiments, the switching controller is further configured to keep a third RMS voltage level of the substantially rectified output provided at the output side approximately equal to the predetermined set point voltage, such as equal within ±50%. Alternatively or additionally, equal within ±25V, such as whichever is less. A root mean square (RMS) voltage may be measured over a sampling period of 1 s.

In some embodiments, the hard-switching circuit is configured to establish a voltage port across a first voltage port junction and a second voltage port junction provided at the input side of the hard-switching circuit.

It is understood that the voltage port may be established by exciting a voltage signal between the first voltage port junction and the second voltage port junction by the hard-switching circuit alternating between switching modes when coupled to a DC voltage source at the input side. The voltage signal may be in the form of waveform with a substantially fixed voltage amplitude, such as pulse-width modulated output.

In some embodiments, one set of the plurality of semiconducting devices of the hard-switching circuit are arranged into at least a first switching subcircuit coupled to the voltage port junctions and including one or more switching elements including the at least a first switching element.

In some embodiments, another set of the plurality of semiconducting devices of the hard-switching circuit are arranged into a rectifying subcircuit, and wherein the hard-switching circuit includes a transformer having primary windings and secondary windings which inductively couple the first switching subcircuit and the rectifying subcircuit in response to a magnetic flux therein between.

In some embodiments, the hard-switching circuit includes a transformer having primary windings and secondary windings, wherein the at least a first switching element, such as a first switching element, is coupled between a first node point and the first voltage port junction and wherein the first switching subcircuit includes:
  a second switching element coupled between the second voltage port junction and a second node point,
  a third switching element coupled between the second node point and the voltage port junction, and
  a fourth switching element coupled between the second voltage port junction and the first node point,
  wherein the first node point and second node point are coupled to the primary windings so that magnetic flux is generated at a primary side of said transformer based on the hard-switching circuit transitioning from one mode to another mode.

In some embodiments, the hard-switching circuit includes a switching controller configured to selectively operate the first switching element, the second switching element, the third switching element and the fourth switching element to generate a pulse-width modulated output.

In some embodiments, the hard-switching circuit is configured to establish a current port across a first current port junction and a second current port junction provided at the output side of the hard-switching circuit.

It is understood that the current port may be established by exciting a current signal between the first current port junction and the second current port junction by the hard-switching circuit alternating between switching modes when connected to a DC or DC-like voltage source. The current signal may be in the form of waveform with a substantially fixed current amplitude, such as saw-tooth or triangular wave waveform being the integral of a pulse-width modulated output. Hereby, power conversion from one DC voltage level to another DC voltage level may be performed e.g. by using a transformer via an intermediate AC-like stage by effectuating changes in magnetic flux between the primary side and secondary side of the transformer.

The hard-switching circuit may be configured to establish a voltage port at an input side and to establish a current port at an output side so that a substantially rectified output is provided at the current port based on a DC voltage at the voltage port.

In some embodiments, the first inductance is arranged between the current port and the output port. Hereby, the first inductance is in series with the current port at the output side of the hard-switching circuit. This may provide that any change in current through the first inductance, e.g. due to time-variations in the substantially rectified output, produces a large self-induced voltage across said first inductance, thereby providing a corresponding increase or decrease in voltage between the current port and the output port. Such a voltage difference may aide in drawing or impede the change in drawing of a forwardly flowing current for example from the current port, though a load coupled across the output port and returned via the current port. The first inductance must thus have a sufficiently large electrical inductance, such as e.g. a high-current coil inductor with an electrical inductance of at least 0.1 mH measured at 128 kHz, such as an inductance above 1 mH, such as between 5 mH and 100 mH. It is contemplated that the first inductance must be rated to handle an output current delivered to a load coupled across the output port, which may be as much as 100 A.

In some embodiments, the hard-switching circuit includes two or more switching elements coupled to the current port junctions, such as the two or more switching elements arranged into a synchronous bridge rectifier configuration coupled to the first current port junction and the second current port junction of the current port.

In some embodiments, the hard-switching circuit includes a first switching subcircuit coupling the input side and the output side, wherein the plurality of semiconducting devices are arranged into the first switching subcircuit further including one or more rectifying elements configured for providing a substantially rectified output, such as by the at least a first switching element opening or closing to generate a pulse-width modulated output. By the first switching subcircuit coupling the input side and the output side of the hard-switching circuit, i.e., by an electrical connection via intermediate semi-conducting devices or by directly coupling them, such a power converter may be a non-isolated DC-DC power converter without galvanic isolation.

In some embodiments, the DC-DC power converter is a non-isolated DC-DC power converter, such as a DC-DC boost converter, such as a DC-DC buck converter.

In some embodiments, the one side of the hard-switching circuit is the output side and the second side is the input side. This may be the case in a boost converter.

In a non-isolated DC-DC power converter, particularly a non-isolated DC-DC boost converter, the first capacitance may be coupled in parallel across one of the at least two power ports, typically the output port, at the output side of the hard-switching circuit and the first inductance may be coupled in series with another of the at least two power ports, typically the input port, of the hard-switching circuit at the input side of the hard-switching circuit opposite the first capacitance.

In some embodiments, the hard-switching circuit is according to one or more of the following switch-mode topologies:
  A. a step-down or "buck" topology,
  B. a step-up or "boost" topology, C. a buck-boost topology,
D. a split-pi topology,
or any combination of the above.

In some embodiments, the power converter is an isolated DC-DC power converter.

In the embodiments where the hard-switching circuit includes an H-bridge inverter having four switching elements and a full-bridge rectifier inductively coupled to the H-bridge inverter output via a transformer, a pulse-width modulated output may be generated by hard-switching the four switching elements. A current may in such an example persist for a very short time after the controller has selectively operated the four switching elements to reverse polarity of a voltage signal excited at the primary windings, e.g., due to inductive coupling between the primary side and the secondary side of the transformer, thus leading to energy losses due to reverse recovery.

The inventors have seen indications that use of a soft-switching circuit according to the present disclosure may be effective in preventing at least part of such losses by storing excess electrical energy via a second inductance and a second capacitance to shorten the time spent in a reverse recovery state e.g. when hard-switching. By e.g. a voltage regulating element being configured to regulate a differential voltage between the first capacitance and the second capacitance, the soft-switching circuit provides the advantage that some of the electrical energy loss may be recovered.

In some embodiments, the one side of the hard-switching circuit is the input side and the second side is the output side.

In an isolated DC-DC power converter, or additionally in a non-isolated DC-DC buck converter, the first capacitance may be coupled in parallel across one of the at least two power ports, typically the input port, at the input side of the hard-switching circuit and the first inductance may be coupled in series with another of the at least two power ports, typically the output port, of the hard-switching circuit at the output side of the hard-switching circuit opposite the first capacitance.

In some embodiments, the hard-switching circuit is according to one or more of the following switch-mode topologies:
A. a push-pull topology,
B. a half-bridge topology,
C. a full-bridge topology,
D. a current-doubler topology,
E. a two-switch forward topology,
F. a resonant, zero-voltage switch topology,
or any combination of the above.

The two-switch forward topology may be one of a single-phase two-switch forward topology, an interleaved two-switch forward topology or the like. It is understood that the push-pull and half-bridge topologies may refer to the topology of inverter circuits, specifically the first switching subcircuit at the primary side of isolated hard-switching circuits, whereas a half-bridge topology for a rectifier circuit is understood to refer to a split-secondary rectifier circuit or the like. Likewise, a current-doubler topology is understood to refer specifically to the topology of the rectifying subcircuit. It is an advantage of embodiments of a switch-mode DC-DC power converter according to the present disclosure that the soft-switching circuit may be combined with many of the above listed topologies for hard-switching circuits to thereby improve them with a relatively simple solution for soft switched turn-on and recovery of turn-on losses.

In some embodiments, the power converter further includes:
a third capacitance coupled in parallel across the another of the at least two power ports at the second side of the hard-switching circuit opposite the first capacitance.

In some embodiments where the first capacitance is coupled in parallel across the input port, the third capacitance is coupled in parallel across the output port. In some yet further embodiments where the first capacitance is coupled in parallel across the output port, the third capacitance is coupled in parallel across the input port. Hereby, another electrical energy reservoir, complementary to the electrical energy reservoir provided by the first capacitance, may be provided at a second side opposite of the hard-switching circuit, to provide a filtering or smoothing effect on a DC or DC-like voltage received or supplied at the input port or output port, respectively.

The third capacitance may have a low enough capacitance to reduce voltage ripple across either the input port or the output port, e.g. providing a substantially constant voltage drop across the third capacitance which changes less than 1% of the overall voltage drop across the third capacitance measured as RMS voltage over time.

In some embodiments, the first inductance is coupled between the second side of the hard-switching circuit and the third capacitance. Hereby, the first inductance and the third capacitance may be coupled together, such as by being directly connected at one terminal, such that the first inductance is configured to carry forward current in a substantially forward direction from the input port to the output port, and a third voltage drop across the third capacitance is kept substantially constant. By coupling the first inductance between the hard-switching circuit and the third capacitance, the power converter is enabled to perform DC-DC conversion with improved efficiency.

In some embodiments, the first capacitance is low-impedance compared to the second capacitance, as measurable by the first capacitance having an electrical capacitance substantially greater than the electrical capacitance of the second capacitance, such as at least 50% greater, such as 100-1000% greater. In another aspect, the first capacitance may be rated to drop a substantially smaller maximum voltage across it than the maximum voltage the second capacitance is rated to drop across it, such as less than 75% of a max. rated voltage of the second capacitance.

In some embodiments, the first inductance is high-impedance compared to the second inductance, as measurable by the first inductance having an electrical inductance being substantially greater than the electrical inductance of the second inductance, such as at least 2 times greater, such as between 5 and 100 times greater. In another aspect, the first inductance may be rated for a substantially larger maximum voltage and/or maximum current than the second inductance.

Disclosed herein is, in a second aspect of the present disclosure, a method of operating a switch-mode DC-DC power converter for converting a high-power DC voltage, such as for charging of an electric vehicle, in a power converter according to the first aspect, wherein the method includes the steps of:
applying a DC input voltage to the input port,
generating a control signal representing a mode of the hard-switching circuit, said mode including an opening state or a closing state of at least a first switching element,
controlling an opening state or a closing state of the at least a first switching element according to the control signal, converting the DC input voltage to provide a substantially rectified output at an output side by pulse-width modulation, reducing a voltage across the second capacitance towards a clamp voltage level substantially above the voltage across the first capacitance by activating the controlled discharger.

Hereby one or more advantages as e.g. described above in relation to the first aspect may be obtained. For example, the method may provide a solution which enables the soft-switching circuit to temporarily store and recover electrical energy in the second capacitance to mitigate negative consequences e.g. of an induced voltage across the second inductance and/or of hard-switching the at least a first switching element during conventional operation of the hard-switching circuit.

For charging of an electrical battery, such as in an electric vehicle or the like, the electrical energy delivered to the electrical battery may be sold and/or purchased as a commercial commodity, and may consequently be a product of the process.

In some embodiments, the method includes the steps of:
detecting a differential voltage between the first capacitance and the second capacitance, such as by means of the controlled discharger, and
selectively activating the controlled discharger based on the detected differential voltage exceeding a predetermined threshold voltage.

In some embodiments, the method further includes the step of:
filtering the substantially rectified output to supply a DC output voltage at a predetermined set point voltage to the output port.

Disclosed herein is, in a third aspect of the present disclosure, use of a switch-mode DC-DC power converter according to the first aspect to provide a DC voltage supply for charging an electrical battery, such as the battery of an electric vehicle. In some embodiments, the supplied power of the switch-mode DC-DC power converter is greater than 10 W, such as greater than 1 kW, such as between 100 W and 3 kW, such as between 10 kW and 10 MW. Supplied power is measured at the output port.

Disclosed herein is, in a fourth aspect of the present disclosure, a switch-mode DC-DC power converter including:
at least two power ports including an input port and an output port,
a hard-switching circuit including a plurality of semiconducting devices including at least a first switching element, the hard-switching circuit configured to receive a DC voltage source at an input side and to provide a substantially rectified output at an output side,
a first capacitance coupled in parallel across one of the at least two power ports at one side of the hard-switching circuit,
a first inductance coupled in series with another of the at least two power ports and the hard-switching circuit at a second side of the hard-switching circuit opposite the first capacitance,
a soft-switching circuit including:
a second inductance coupled to the first capacitance and to at least one of the plurality of semiconducting devices; and
a first rectifying element coupled to the second inductance to clamp the second inductance by forward biasing the first rectifying element based on an induced voltage across the second inductance in response to the hard-switching circuit transitioning from one mode to another mode,
wherein the second inductance is a clamped inductive element.

Hereby at least some of the advantages as e.g. described above in relation to the first aspect may be obtained. For example, the DC-DC power converter may provide a cheaper solution which enables the soft-switching circuit to provide soft switched turn-on and nearly lossless charging of parasitic capacitances of the hard-switching circuit. This may e.g. be attractive for designing cheaper DC-DC power converters.

BRIEF DESCRIPTION OF THE DRAWINGS

Various examples are described hereinafter with reference to the figures. Like reference numerals refer to like elements throughout. Like elements will, thus, not be described in detail with respect to the description of each figure. The figures are only intended to facilitate the description of the examples. They are not intended as an exhaustive description of the claimed invention or as a limitation on the scope of the claimed invention. In addition, an illustrated example needs not have all the aspects or advantages shown. An aspect or an advantage described in conjunction with a particular example is not necessarily limited to that example and can thus be practiced in any other examples even if not illustrated or not explicitly described.

DESCRIPTION OF EXAMPLES

Figure 1:
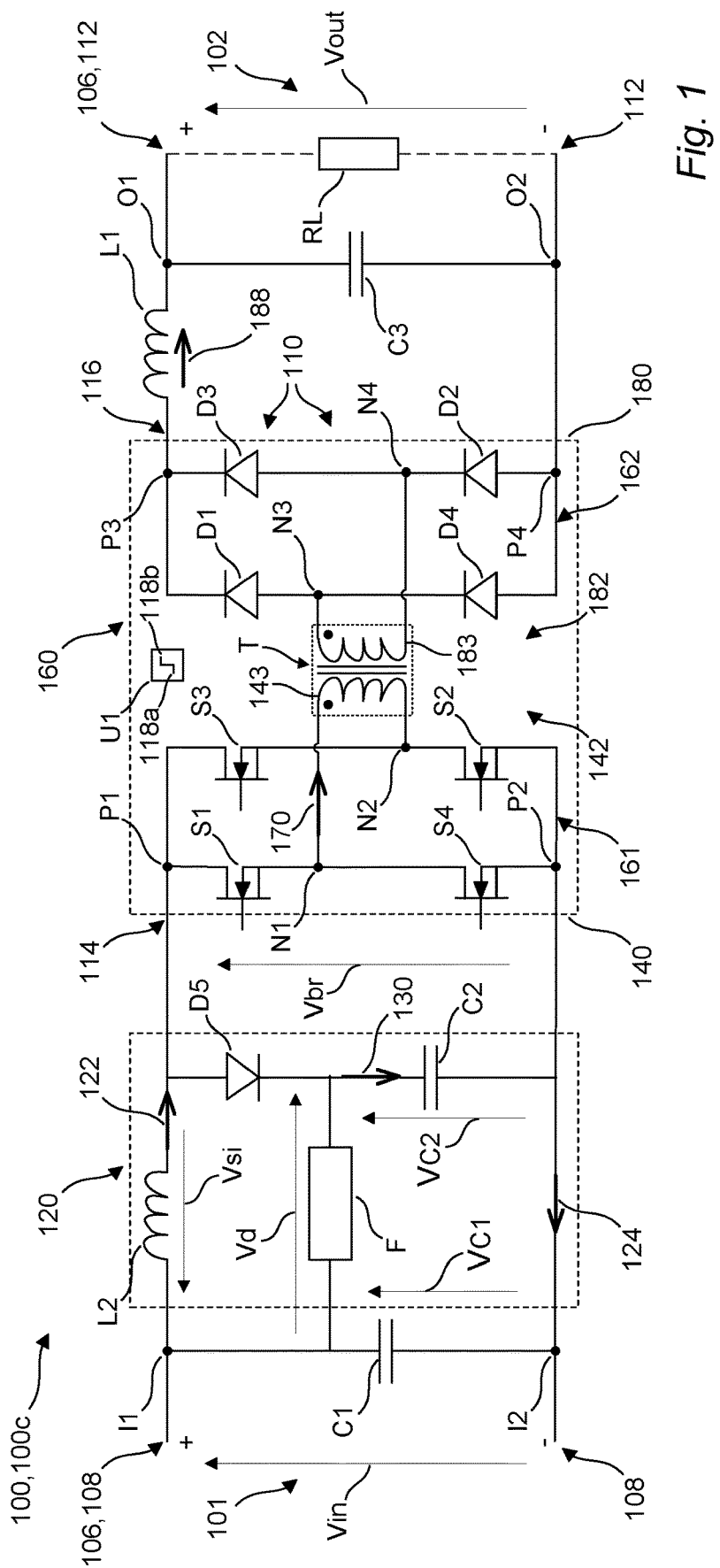
FIG. 1 illustrates an isolated DC-DC power converter according to embodiments of the present disclosure with an H-inverter including four switching MOSFETs in a full-bridge configuration and a full-bridge rectifier including four rectifying diodes.

Exemplary examples will now be described more fully hereinafter with reference to the accompanying drawings. In this regard, the present examples may also have different forms and should not be construed as being limited to the descriptions set forth herein. Accordingly, the examples are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Throughout the specification, when an element is referred to as being "connected" or "coupled" to another element, that element is either "directly connected" or "direct coupled" to the other element, respectively, or "electrically connected" to the other element with one or more intervening elements interposed therein between.

The terminology used herein is for the purpose of describing particular examples only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About", "approximately" or "substantially" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "substantially" may mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined in the present specification.

Exemplary examples are described herein with reference to cross section illustrations that are schematic illustrations of idealized examples, wherein like reference numerals refer to like elements throughout the specification. As such, variations from the shapes of the illustrations as a result, for example, of manufacturing techniques and/or tolerances, are to be expected. Thus, examples described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. Some of the parts which are not associated with the description may not be provided in order to specifically describe exemplary examples of the present disclosure.

FIG. 1 is an illustration of a switch-mode DC-DC power converter 100 converting a DC input voltage Vin to a DC output voltage Vout. The DC-DC power converter 100 is shown with two power ports 106 comprising an input port 108 and an output port 112. Hereby, the input port 108 is operable to be coupled to any DC voltage source 101 applying said input voltage Vin to the power converter 100, whereby the output port 112 is further operable to be coupled to a load RL, a rechargeable battery 194 (not shown) or the like for supplying said output voltage Vout by means of the power converter 100. The output voltage Vout may be greater or less than the input voltage Vin depending on the configuration and operation of the power converter 100. It is understood that, within a unit of time, the amount of electrical energy consumed at the input port 108 is ordinarily commensurate with the amount of electrical energy supplied at the output port 112 minus the energy losses within the power converter 100 during said unit of time. The power converter 100 is shown with the input port 108 including a first input terminal I1 and a second input terminal I2. A DC voltage source 101 is shown being electrically connected to the first input terminal I1 and the second input terminal I2 to apply an input voltage Vin therein between. The output port 112 includes a first output terminal O1 and a second output terminal O2, so that a DC voltage supply 102 is provided by being electrically connected to the first output terminal O1 and the second output terminal O2 to thereby supply an output voltage Vout to a load RLT coupled therein between.

The DC-DC power converter 100 is shown including a hard-switching circuit 160. The hard-switching circuit 160 comprises a plurality of semiconducting devices 110. Each of said semiconducting device 110 may be chosen among one or more known types of semiconducting devices including MOSFETs, IGBTs, diodes or the like. The plurality of semiconducting devices 110 are shown including at least a first switching element S1 in the form of four switching elements S1-S4. In this example, the four switching element S1-S4 are in the form of a first, a second, a third and a fourth N-channel power MOSFET, S1-S4 respectively, being arranged into a first switching subcircuit 161 in a H-bridge inverter configuration 161. Additionally, the plurality of semiconducting devices 110 are shown including a plurality of rectifying elements D1-D4. Here, the plurality of rectifying elements D1-D4 are shown as four power diodes D1-D4 being arranged into a rectifying subcircuit 162 in a full-bridge rectifier configuration 162. Thus, the power-converter 100 is in full-bridge configuration.

As shown, the hard-switching circuit 160 is configured to establish a voltage port 114 across a first voltage port junction P1 and a second voltage port junction P2 provided at an input side 140 of the hard-switching circuit 160. Hereby, the hard-switching circuit 160 is configured to receive a DC voltage source 101 at an input side 140. The hard-switching circuit 160 is shown further including a transformer T having primary windings 143 and secondary windings 183. Shown are four switching elements S1-S4 in the at least a first switching element S1 being arranged between a first node point N1, a second node point N2 and the first voltage port junction P1 and the second voltage port junction P2 in an H-bridge inverter configuration 161. The first node point N1 and the second node point N2 are coupled to the primary windings 143 of the transformer T so that a magnetic flux 150 (not shown) may be generated at a primary side 142 of said transformer T based on the hard-switching circuit 160 transitioning from one mode 118a to another mode 118b, e.g., when the at least a first switching element S1-S4 changes from a substantially "off" or opening state to a substantially "on" or closing state. Here, the first switching subcircuit 161 includes a first switching element S1 coupled between the first node point N1 and the first voltage port junction P1; a second switching element S2 coupled between the second voltage port junction P2 and the second node point N2; a third switching element S3 coupled between the second node point N2 and the voltage port junction P1; and a fourth switching element S4 coupled between the second voltage port junction P2 and the first node point N1. In this example, one set (not shown) of the plurality of semiconducting devices 110 of the hard-switching circuit 160 are thus arranged into a first switching subcircuit 161 coupled to the voltage port junctions P1,P2, said one set (not shown) comprising the four switching elements S1-S4.

Transitioning between modes 118a-b of the hard-switching circuit 160 may include one or more of the plurality of semiconducting devices 110 of the hard-switching circuit 160 changing from a substantially unconducive "off" mode to a substantially conductive "on" mode. Additionally or alternatively, transitioning between modes 118a-b of the hard-switching circuit 160 may include one or more of the plurality of semiconducting devices 110 of the hard-switching circuit 160 changing from a substantially conducive "on" mode to a substantially unconducive "off" mode.

As further shown, the hard-switching circuit 160 is configured to establish a current port 116 across a first current port junction P3 and a second current port junction P4 provided at an output side 180 of the hard-switching circuit 160. Hereby, the hard-switching circuit 160 is configured to provide a substantially rectified output 188 at an output side 180 of the hard-switching circuit 160 based on receiving a DC voltage source 101 at an input side 140 by operating the four switching elements S1-S4. In this example, another set (not shown) of the plurality of semiconducting devices 110 of the hard-switching circuit 160 are arranged into a rectifying subcircuit 162, said another set (not shown) including the four power diodes D1-D4 of the rectifying subcircuit 162. These four power diodes D1-D4 of the rectifying subcircuit 162 are shown arranged between a third node point N3, a fourth node point N4, the first current port junction P3 and the second current port junction P3 in a full-wave bridge rectifier configuration 162. The third node point N3 and the fourth node point N4 are shown coupled to the secondary windings 183 of the transformer T so that magnetic flux 150 (not shown) being generated at the primary side 142 may be transferred via the transformer T to the secondary side 182 by inductive coupling.

The power converter 100 is shown in the form of an isolated DC-DC converter 100c, which is evident by the transformer T providing a galvanic isolation between the first switching subcircuit 161 and the rectifying subcircuit 162. Hereby, at least two power ports 106 are isolated from one another as clearly seen by the output port 112 being provided in galvanic isolation from the input port 108 by means of the transformer T. Consequently, the hard-switching circuit 160 is shown including the transformer T which has primary windings 143 and secondary windings 183 that inductively couple the first switching subcircuit 161 and the rectifying subcircuit 162 in response to a magnetic flux 150 therein between, such as a time-varying magnetic flux 150.

The hard-switching circuit is shown also including a switching controller U1. The switching controller U1 is configured to selectively operate at least the first switching element S1 to generate a pulse-width modulated output 170. It is understood that the switching controller U1 may for example be configured to selectively operate all four switching elements S1-S4 of the first switching subcircuit 161, e.g., by generating a control signal 176 (not shown) for controlling the four switching elements S1-S4. It is further understood that such a control signal 176 (not shown) may represent two or more modes 118a-b of the hard-switching circuit 160 and/or a suitable signal for provisioning a transitioning of the hard-switching circuit 160 from one mode 118a to another mode 118b. In the example of the first switching subcircuit 161 comprising four power MOSFETs S1-S4, the switching controller U1 may generate four control signals 176 (not shown) in the form of four gate voltages Vg (not shown), each gate voltage Vg (not shown) being either high or low representing the on or off states.

Thus, the switching controller U1 is enabled to control the modes 118a-b of the hard-switching circuit 160, each mode 118a-b including an opening state 177 (not shown) or a closing state 178 (not shown) of at least a first switching element S1-S8, or as shown here, an opening state 177 (not shown) or a closing state 178 (not shown) of each of the four switching element S1-S4. A hard-switching circuit 160 including at least a first switching element S1-S8 may be operated in a first mode 118a, wherein the at least a first switching element S1 is in the opening state 177 or "off"

state, and also a second mode 118b, wherein the at least a first switching element S1 is in the closing state 178 or "on" state, at so forth. Hard-switching includes transitioning the hard-switching circuit 160 between the first mode 118a and the second mode 118b in this example, so that a pulse-width modulated output 170, square wave output or the like is generated. In this example, a pulse-width modulated output 170 may be generated, e.g., by at first time instance closing the first switching element S1 and the second switching element S2 while opening the third switching element S3 and the fourth switching element S4, and then, at a second time instance a short time after the first time instance, opening all four switches S1-S4, and then, at a third time instance a short time after the second time instance, closing the third switching element S3 and the fourth switching element S4 while keeping the first switching element S1 and the second switching element S2 open, and then, at a fourth time instance a short time after the third time instance, again open all four switches S1-S4 and repeating this sequence at a later fifth time instance etc. In this manner, a voltage signal (not shown) is excited between the first voltage port junction P1 and the second voltage port junction P2, or specifically between the first node point N1 and the second node point N2, by repeatedly transitioning the hard-switching circuit 160 between modes 118a-c when an input voltage Vin is applied at the input side 140, such as from a DC voltage source 101 at the input port 108. The pulse-width modulated output 170 thus generates a time-varying magnetic flux 150 at the transformer T to inductively couple the primary side 142 and the secondary side 182, whereby electrical energy may be transferred therein between and further converted between voltage levels. The rectifying subcircuit 162 is shown receiving electrical energy from the first switching subcircuit 161 via a pulse-width modulated output 170 being transferred across the transformer T and providing a substantially rectified output 188 at the output side 180 of the hard-switching circuit 160 based thereon. As shown here, the four power diodes D1-4 are in a rectifier configuration 162, or full-wave bridge rectifier configuration 162, providing a substantially rectified output 188 via the first current port junction P3 and the second current port junction P4 of the current port 116 based on the pulse-width modulated output 170.

The isolated power converter 100,100c is shown including a first capacitance C1 coupled in parallel across the input port 108 of the at least two power ports 106 at the input side 140 of the hard-switching circuit 160, e.g., being electrically connected between the first input terminal I1 and the second input terminal I2 of the input port 108. Hereby, the first capacitance C1 is coupled in parallel across one of the at least two power ports 106,108;112 at one side 140;180 of the hard-switching circuit 160. As shown here, the first capacitance C1 is coupled between the input terminals I1,I2 of the input port 108 so that an input voltage Vin applied, e.g., by a DC voltage source 101 charges the first capacitance C1 to approximately the input voltage Vin. Thus, the first capacitance C1 provides an electrical energy reservoir (not shown) with low impedance for the input side 140 of the hard-switching circuit 160 to store or recover electrical energy during operation of the hard-switching circuit 160.

The isolated power converter 100,100c is shown including a first inductance L1 coupled in series with the output port 112 and the hard-switching circuit 160 at the output side 180 of the hard-switching circuit 160 opposite the first capacitance C1. Hereby, the first inductance L1 is coupled in series with another of the at least two power ports 106,112; 108, the said another of the at least two power ports 106,112;108 being different from the one of the at least two power ports 106,108;112 discussed above, and with the hard-switching circuit 160 at a second side 180;140 of the hard-switching circuit 160 opposite the first capacitance C1, the second side 180;140 being different from the one side 140;180 of the hard-switching circuit 160 above. In this example, the first inductance L1 coupled in series with the output port 112 and the hard-switching circuit 160 at the output side 180 by being electrically connected between the first current port junction P3 and the first output terminal O1, but it clear that the first inductance L1 may be provided in series between the output side 180 of the hard-switching circuit 160, i.e. the current port 116, and the output port 112 in a number of equivalent ways, e.g. by being electrically connected between the second current port junction P4 and the second output terminal O2.

It is understood that the hard-switching circuit 160, the first capacitance C1 and the first inductance L1, together with a switching controller U1 and a DC voltage source 101, may be sufficient to operate a switch-mode DC-DC power converter 100 where the input port 108 would e.g. be directly connected to the input side 140 of the hard-switching circuit 160, for example using hard-switching techniques known in the art. In this example, it is contemplated that a cheap but ineffective power converter 100 may be constructed simply by directly connecting the first input terminal I1 to the first voltage port junction P1 and the second input terminal I2 to the second voltage port junction P2, so that the input voltage Vin is applied across the voltage port 114. It is however considered by the inventors that an improved conversion performance is needed for switch-mode DC-DC power converters 100 for delivering large amounts of electrical power in a cheap, simple and reliable manner. Preferably, a converter 100 should have a power density above 100 W/kg, such as above 1 kW/kg, in order to be a desirable solution for on-board conversion in electric or hybrid vehicles.

Thus, the DC-DC power converter 100 is shown including a soft-switching circuit 120. The soft-switching circuit 120 comprises a second capacitance C2. Hereby, an electrical energy reservoir (not shown) with a moderately low impedance is provided at the soft-switching circuit 120 for temporarily storing or recovering electrical energy proximate the first capacitance C1 during operation of the soft-switching circuit 120.

The soft-switching circuit 120 includes a second inductance L2 coupled to the first capacitance C1 and to at least one of the plurality of semiconducting devices 110. In this example, the plurality of semiconducting devices 110 includes at least the first switching element S1, the second switching element S2, the third switching element S3 and the fourth switching element S4 of the first switching subcircuit 161 and also the four power diodes D1-D4 of the rectifying subcircuit 162. As shown, the second inductance L2 is directly coupled to one of the two terminals (not shown) of the first capacitance C1 and to the first switching element S1 and the third switching element S3 via the first voltage port junction P1, but equivalent ways of coupling it may exist. Hereby, the second inductance L2 is coupled to the first capacitance C1 and to at least one of the plurality of semiconducting devices 110, so that an induced voltage Vsi is generated across the second inductance L2 in response to the hard-switching circuit 160 transitioning from one mode 118a to another mode 118b-c or vice versa.

The soft-switching circuit 120 includes a first rectifying element D5 coupled to the second inductance L2 and the second capacitance C2. In this example, the second capacitance C2 and the first rectifying element D5 are arranged in series to each other and together coupled in parallel with the voltage port 114 at the input side 140 of the hard-switching circuit 160. Hereby, they are coupled in parallel to the one side 140;180 of the hard-switching circuit 160. As shown, this series arrangement of the second capacitance C2 and the first rectifying element D5 is thus coupled in parallel across the voltage port 114, i.e., the anode (not shown) of the first rectifying element D5 directly coupled to the first voltage port junction P1, the cathode (not shown) of the first rectifying element D5 directly coupled to one of two terminals (not shown) of the second capacitance C2 and an opposite of the two terminals (not shown) of the second capacitance C2 directly coupled to the second voltage port junction P2.

Thus, the second capacitance C2 is coupled such that it may be charged by forward biasing the first rectifying element D5 when a forward bias voltage Vfb (not shown) is applied across the first rectifying element D5. Hereby, the first rectifying element D5 is coupled between the second inductance L2 and the second capacitance C2 to charge the second capacitance C2 by forward biasing the first rectifying element D5 based on the induced voltage Vsi across the second inductance L2 when the hard-switching circuit 160 is transitioning from one mode 118a to another mode 118b-c. In this way, the first rectifying element D5 is configured to provide a clamped output 130 to charge the second capacitance C2 based on an induced voltage Vsi across the second inductance L2. It is understood that, in this example, the induced voltage Vsi may be a result of changes in a forward current 122 from the input port 108 and through the second inductance L2 towards the current port 114. The forward current 122 is shown being driven by a bridge voltage Vbr across the voltage port junctions P1,P2 in response to at least the first switching element S1 opening or closing. This it understood to supply electrical energy in a forward direction 122 for generating the pulse-width modulated output 170 and, additionally, for the clamped output 130. The recombined currents may then return to the input port 108 via a return path 124.

As shown, the anode (not shown) of the first rectifying element D5 is subjected to an electrical potential (not shown) equal to the voltage VC1 across the first capacitance C1 minus the induced voltage Vsi across the second inductance L2, e.g. referenced to "ground" at the second input terminal I2, whereas the cathode (not shown) of the first rectifying element D5 is subjected to an electrical potential (not shown) equal to the voltage VC2 across the second capacitance C2. Thus, forward biasing the first rectifying element D5 occurs when the difference between the voltage VC1 across the first capacitance C1 and the induced voltage Vsi across the second inductance L2 exceed the voltage VC2 across the second capacitance C2 by some small non-negative amount, such as e.g. a forward bias voltage Vfb (not shown) above 0.7V for Si-diodes. Further, the first rectifying diode D5 of the soft-switching circuit 120 is being reverse biased when the difference between the voltage VC1 across the first capacitance C1 and the induced voltage Vsi across the second inductance L2 does not exceed the voltage VC2 across the second capacitance C2, thus also retaining electrical energy previously stored in the second capacitance C2 via the clamped output 130. It is an advantage of the soft-switching circuit 120 that the first rectifying element D5 may provide both charging and charge retention effects for the second capacitance C2 by forward biasing and reverse biasing of the first rectifying element D5 respectively, based on the induced voltage Vsi across the second inductance L2, as this enables a solution where electrical energy which would otherwise have been lost may be temporarily stored and recovered via the second capacitance C2. It is a further advantage that the induced voltage Vsi across the second inductance L2 is primarily generated by a time-varying forward current 122 being driven through the second inductance 122 in response to the hard-switching circuit 160 transitioning from one mode 118a to another mode 118b, as this allows the soft-switching circuit 120 to temporarily store and recover more electrical energy in response to the hard-switching circuit 160 reducing or increasing the forward current 122, respectively.

The soft-switching circuit 120 includes a controlled discharger F coupled to the second capacitance C2. The controlled discharger F may provide that a voltage VC2 across the second capacitance C2 is maintained within a voltage range (not shown) with a lower bound (not shown) at a voltage level Vclamp (not shown) substantially above the voltage VC1 across the first capacitance C1, such as at least 5V above. The clamped output 130 may charge the second capacitance C2 to a voltage VC2 substantially above a voltage VC1 across the first capacitance C1 and/or exceeding the input voltage Vin applied at the input port 108 by a DC voltage source 101 by an increasingly large amount, for example until a maximum rated voltage is exceeded. In such cases, the controlled discharger F may reduce the voltage VC2 across the second capacitance C2 towards the voltage level Vclamp (not shown) substantially above the voltage VC1 across the first capacitance C1. As shown, the controlled discharger F is coupled to the second capacitance C2 to then reduce a voltage VC2 across the second capacitance C2 based on a differential voltage Vd between the voltage VC1 across the first capacitance C1 and the voltage VC2 across the second capacitance C2. Hereby, electrical energy stored in the second capacitance C2 may be recovered at an opportune moment without exceeding maximum rated voltages. This recovered electrical energy may, e.g., be transferred to the first capacitance C1, thereby also improving overall energy efficiency of the power converter 100,100c.

Thus, maintaining a voltage VC2 across the second capacitance C2 at a the voltage level Vclamp (not shown), or within a voltage range (not shown) with a lower bound (not shown) at a voltage level Vclamp (not shown), may include reducing the voltage VC2 across the second capacitance C2 towards said voltage level Vclamp. Further, reducing the voltage VC2 across the second capacitance C2 towards said voltage level Vclamp may include selectively, continually and/or periodically activating the controlled discharger F to at least partially discharge the second capacitance C2.

For example, the controlled discharger F may selectively activate to at least partially discharge the second capacitance C2 by transitioning two terminals of the controlled discharger F from a substantially non-conducting or "high Z" state to a substantially conducting state to thereby allow charge to pass from one of the two terminals of the second capacitance C2, through the two terminals of the controlled discharger F and towards one of the two terminals of the first capacitance C1 based on a differential voltage Vd therein between. Alternatively or additionally, the controlled discharger F may selectively activate to at least partially discharge the second capacitance C2 by providing a large resistive load (not shown) e.g. towards lower electrical potential.

In some embodiments, the power converter 100 includes a first capacitance C1 in the form of a low-impedance input capacitance C1, as shown in this example, and also includes a third capacitance C3 in the form of an output capacitance C3. Here, the isolated power converter 100,100c is shown including such a third capacitance C3 coupled in parallel across the output port 112 at the output side 180 of the hard-switching circuit 160 opposite first capacitance C1, e.g., being electrically connected between the first output terminal O1 and the second output terminal O2 of the output port 112. Hereby, the third capacitance C3 is coupled in parallel across the another of the at least two power ports 106,112;108 at the second side 180;140 of the hard-switching circuit 160 opposite the first capacitance C1. In this example, the coupling of the first inductance L1 and the third capacitance C3 provides an LC low-pass filter subcircuit (not shown) between the current port 116 of the hard-switching circuit 160 and the output port 112, whereby the substantially rectified output 188 is filtered.

It is an advantage that implementations of a DC-DC power converter 100 according to embodiments of the present disclosure may be provided in the form of an isolated switch-mode DC-DC power converter 100c because the transformer turns-ratio provides a very easy method for lowering or increasing the output voltage range versus the input voltage range. Further, the galvanic isolation between at least two power ports 106 helps to prevent stray current and improves safety. In this example, the joint operation of the first switching subcircuit 161, the transformer T and the rectifying subcircuit 162 enables the hard-switching circuit 160 to provide a substantially rectified output 188 at the output side 180 by exciting a current signal (not shown) between the first current port junction P3 and the second current port junction P4 by the hard-switching circuit 160 transitioning between one mode 118a and another mode 118b-c i.e. switching the four switching elements S1-S4 between on/off, when the input side 140 is provided with a DC or DC-like voltage source 101.

It is furthermore an advantage that implementations of an isolated switch-mode DC-DC power converter 100c according to embodiments of the present disclosure may provide soft switched turn-on and nearly lossless charging of parasitic capacitances of hard-switching circuits 160 also comprising a transformer T, which may itself have intra-winding capacitances. In this aspect, the inventors have seen good indications that provisioning a second inductance L2, as e.g. illustrated in the present example of FIG. 1, may also help to reduce or rate limit charging of inter-winding parasitic capacitances between the primary windings 143 and the secondary windings 183 of the transformer T. The soft-switching circuit 120 provides an alternative solution for mitigating common mode noise currents in power converters 100,100c, where such common mode noise currents may be created by fast voltage transient responses and where designing power converters 100 immune to fast voltage transient responses traditionally includes expensive power electronic components aimed at lowering the inter-winding capacitance of the transformer T. Thus, the power converter 100,100c provides improved conversion performance by reducing switching loss due to charging and discharging of parasitic capacitances.

Figure 2:
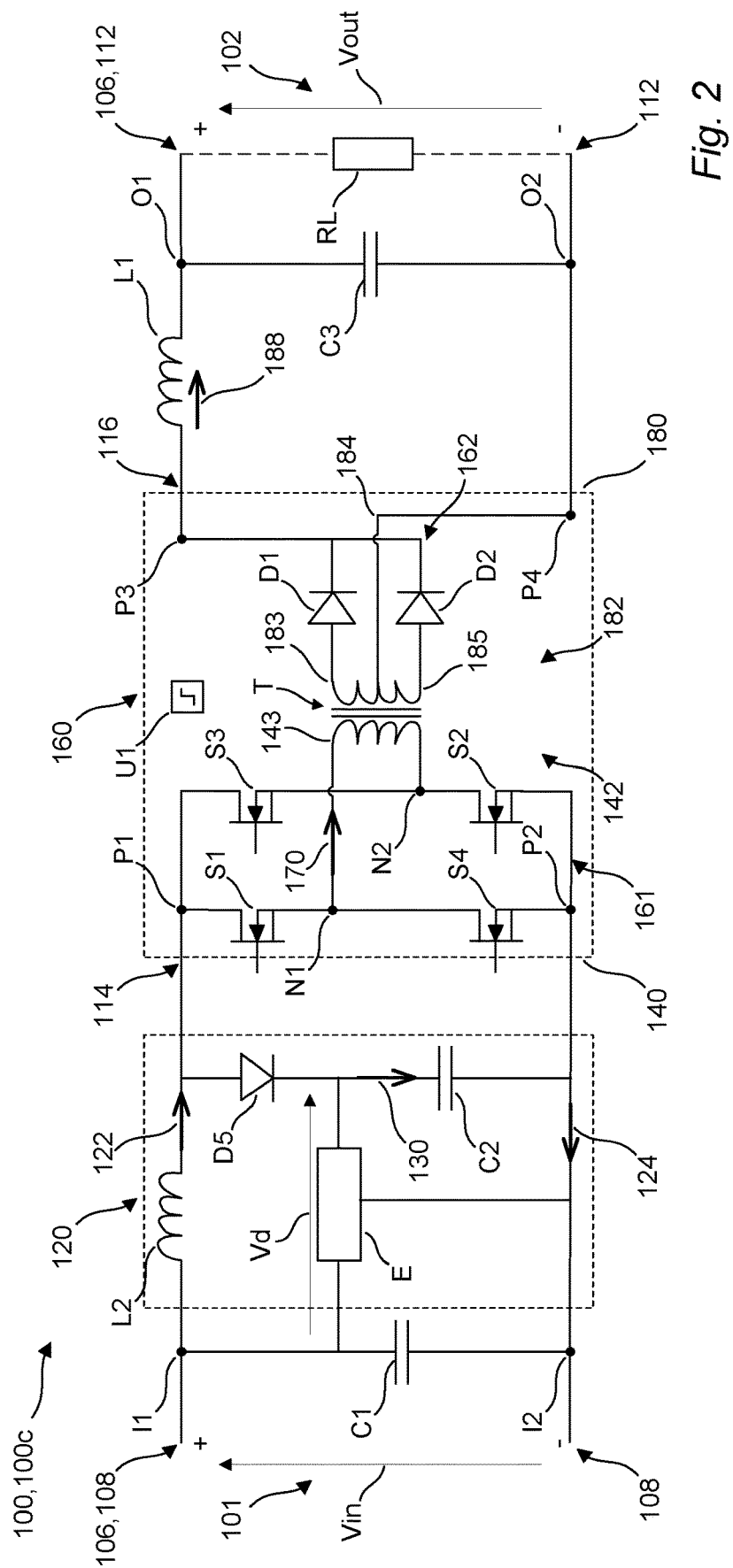
FIG. 2 illustrates an isolated DC-DC power converter according to embodiments of the present disclosure with an H-inverter including four switching MOSFETs in a full-bridge configuration and a half-bridge rectifier including two rectifying diodes.

FIG. 2 is an illustration of an isolated switch-mode DC-DC power converter 100c according to another embodiment of the present disclosure also including a hard-switching circuit 160, a soft-switching circuit 120, a first capacitance C1 and a first inductance L1. The hard-switching circuit 160 includes a first switching subcircuit 161 in an H-bridge inverter configuration 161 including at least a first switching element S1 in the form of four power MOSFETs S1-S4, as for example discussed above in relation to FIG. 1.

The hard-switching circuit 160 includes a center-tapped transformer T having primary windings 143 at a primary side 142, as above, but has both secondary windings 183 and tertiary windings 185 at a secondary side 182 with a center-tapped wire 184 provided between said secondary and tertiary windings 183,185. In this example, only two of the plurality of semiconducting devices 110 of the hard-switching circuit 160 are arranged into a rectifying subcircuit 162, i.e., the rectifying subcircuit 162 includes two power diodes D1-D2. The two power diodes D1-D2 of the rectifying subcircuit 162 are arranged with their respective anodes (not shown) coupled to either of the secondary windings 183 and tertiary windings 185, respectively, and with their cathodes (not shown) coupled to the first inductance L1, whereas the center-tapped wire 184 is coupled to the second output terminal O2. It is understood that providing a rectifying subcircuit 162 in half-bridge rectifier or split-secondary rectifier configuration 162 may in some circumstances be preferable to a full-bridge rectifier configuration 162, as for example illustrated in FIG. 1 above. For example, only two rectifying diodes D1-D2 and a center tapped transformer T may be required to provide that a magnetic flux 150 generated at the primary side 142 is transferred via the transformer T to the secondary side 182 by inductive coupling.

In this embodiment of the isolated DC-DC power converter 100,100c, the controlled discharger F is in the form of a voltage regulating element E, here shown with three terminals instead of the two terminals of the controlled discharger F shown in FIG. 1. The voltage regulating element E is configured to receive and regulate a differential voltage Vd between the first capacitance C1 and the second capacitance C2, said differential voltage Vd being substantially less than an input voltage Vin applied by the DC voltage source 101. In some embodiments, the differential voltage Vd may be numerically less than half of the input voltage Vin, such as numerically less than a quarter of the input voltage Vin. Here, the voltage regulating element E is coupled between the first capacitance C1 and the second capacitance C2 to discharge the second capacitance C2 into the first capacitance C1 e.g. based on the differential voltage Vd therein between exceeding a threshold voltage Vth (not shown). The voltage regulating element E provides that the differential voltage Vd between the first capacitance C1 and the second capacitance C2 may be received and regulated by said voltage regulating element E, thus providing improved control of a voltage drop VC2 (not shown) across the second capacitance C2 e.g. relative to a "ground" reference voltage, as for example shown here by one of the three terminals of the voltage regulating element E being connected to the second input terminal I2.

Figure 3:
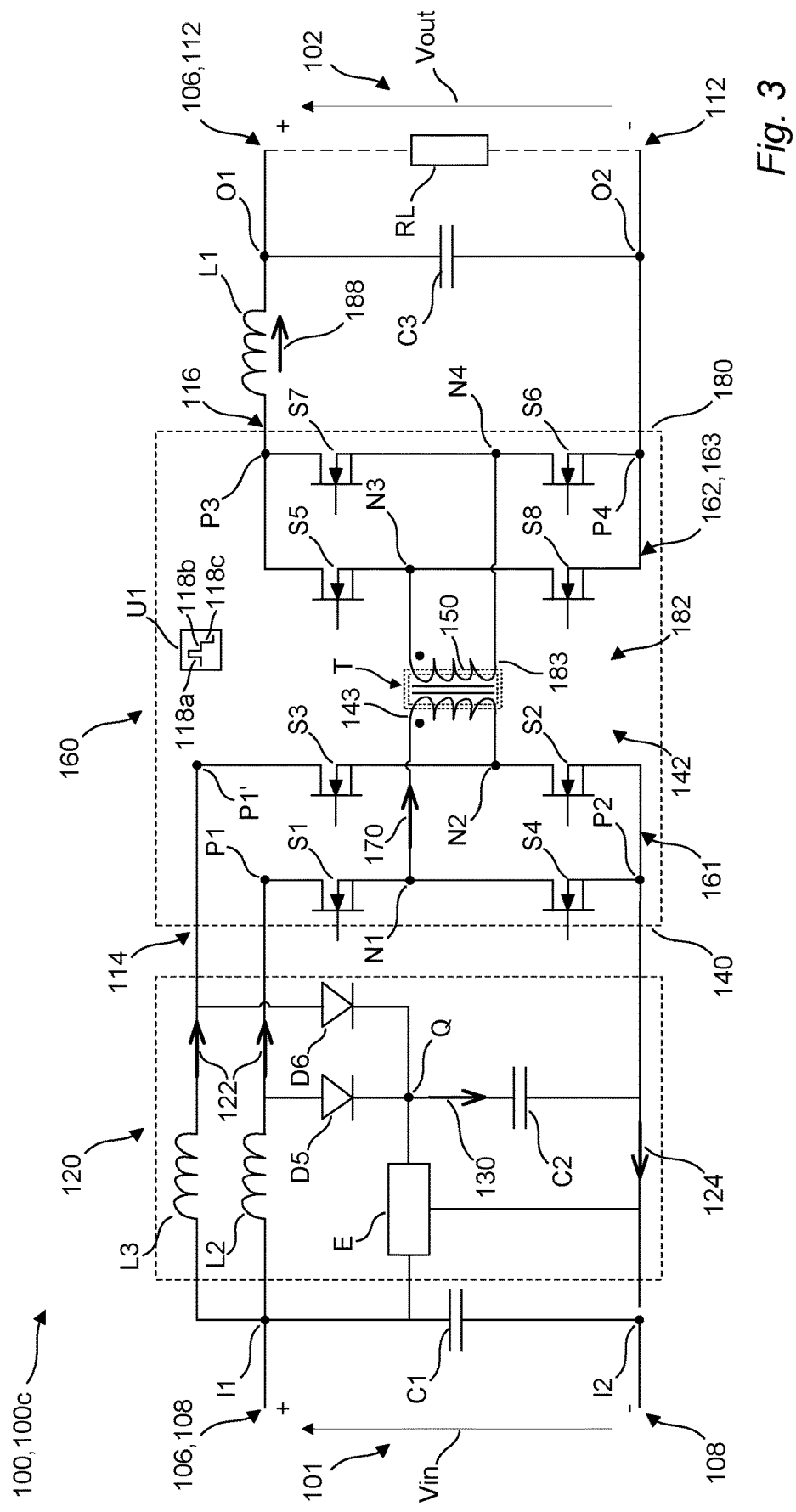
FIG. 3 illustrates an isolated DC-DC power converter according to embodiments of the present disclosure with an H-inverter including four MOSFETs in a full-bridge configuration and a full-bridge synchronous rectifier including four MOSFETs.

FIG. 3 is an illustration of an isolated DC-DC power converter 100c according to yet another embodiment of the present disclosure also including a hard-switching circuit 160, a soft-switching circuit 120, a first capacitance C1 and a first inductance L1. The hard-switching circuit 160 includes a first switching subcircuit 161 in an H-bridge inverter configuration 161 including comprising at least a first switching element S1 in the form of four power MOSFETs S1-S4, as for example discussed above in relation to FIGS. 1-2 above. The hard-switching circuit 160 likewise includes a transformer T having primary windings 143 and secondary windings 183. In addition to the four power MOSFETs S1-S4 shown at the primary side 142, the hard-switching circuit 160 further comprises one or more switching elements S5-8 in the form of a fifth, a sixth, a seventh and a eight N-channel power MOSFET, S5-S8 respectively, being arranged into a second switching subcircuit 163 to form a synchronous or "active" bridge rectifier 162,163 at the secondary side 182. Hereby, one or more switching elements S5-8 are coupled to the current port 116 by the four power MOSFETs S5-8 being arranged into a synchronous bridge rectifier configuration 163 coupled to the first current port junction P3 and the second current port junction P4, whereby hard-switching techniques may be applied to control the eight power MOSFETs S1-S8 so that a substantially rectified output 188 is provided at the output side 180 as shown. These four power MOSFETs S5-S8 of the rectifying subcircuit 162 are, similarly to in FIG. 1, shown arranged between a third node point N3, a fourth node point N4, the first current port junction P3 and the second current port junction P3 in a full-bridge synchronous rectifier configuration 163. The third node point N3 and the fourth node point N4 are coupled to the secondary windings 183 of the transformer T such that, depending on the state of each power MOSFET S5-S8, the magnetic flux 150 being generated at the primary side 142 may be transferred via a magnetic core (not shown) of the transformer T to the secondary side 182 by inductive coupling.

In this embodiment of the isolated DC-DC power converter 100*c*, the soft-switching circuit 120 includes a third inductance L3, in analogy to the second inductance L2, and a second rectifying element D6, in analogy to the first rectifying element D5, so that the forward current 122 may be split in two smaller forward currents 122, e.g., approximately equally, via the second inductance L2 and the third inductance L3. Here, the third inductance L3 is likewise coupled to the first capacitance C1 and to at least one of the plurality of semiconducting devices 110, but unlike the second inductance L2 which is coupled, e.g., as illustrated in FIG. 1-2, the third inductance L3 is coupled to the second rectifying element D6 and another voltage port junction P1'. A cathode (not shown) of the second rectifying element D6 is coupled to a common regulator probe point Q in analogy to the coupling of the first rectifying element D5. In this manner, the induced voltages Vsi (not shown) across the second inductance L2 and the third inductance L3 pertain to changes only in a corresponding part of the forward current 122 from the input port 108 and through the relevant second or third inductance L2,L3 towards the current port 114. Thus, this embodiment of the soft-switching circuit 120 may provide reduced forward current 122 through the second inductance L2 and improved control of soft switched turn-on and recovery of turn-on losses by each forward current 122 being driven via fewer power MOSFETs S1;S3. It is understood that, in an alternative embodiment, the first voltage port junction P1 and the another voltage port junction P1' may be electrically connected to thereby implement a simpler soft-switching circuit 120 without the third inductance L3 and the second rectifying element D6, as for example illustrated in FIGS. 1-2 above.

The hard-switching circuit is shown including a switching controller U1, as also discussed above in relation to FIG. 1. The switching controller U1 is configured to selectively operate the at least the first, second, third and fourth switching element S1-S4 to generate a pulse-width modulated output 170 and is further configured to selectively operate the fifth, sixth, seventh and eight switching element S5-S8 to provide a substantially rectified output 188 based thereon. It is understood that the switching controller U1 may be configured to selectively operate all four switching elements S1-S4 of the first switching subcircuit 161 and all four switching elements S5-S8 of the synchronous rectifying subcircuit 162,163 e.g. by generating a control signal 176 (not shown) for controlling the eight switching elements S1-S8. It is also understood that such a control signal 176 (not shown) may represent three or more modes 118*a-c* of the hard-switching circuit 160 and/or one or more suitable signals for provisioning a transitioning of the hard-switching circuit 160 from one mode 118*a* to another mode 118*b*, from another mode 118*b* to yet another mode 118*c* and so forth. Thus, when the hard-switching circuit 160 includes eight power MOSFETs S1-S8, the switching controller U1 may provide eight gate voltages Vg (not shown), so that the hard-switching circuit 160 can repeatedly cycles through its successive modes 118*a-c* with synchronization of the primary and secondary sides 142,182. An isolated power converter 100*c* comprising a hard-switching circuit 160 in full-bridge configuration 161,162 with synchronous rectification 163 may thus provide that the second capacitance C2 can be charged up more frequently during operation of the hard-switching circuit 160, e.g., twice as often during one pulse repetition interval Tin response to the hard-switching circuit 160 transitioning from one mode 118*a* to another mode 118*b* and from said another mode 118*b* to yet another mode 118*c*. This may provide an advantage of improved energy conversion efficiency also.

Figure 4:
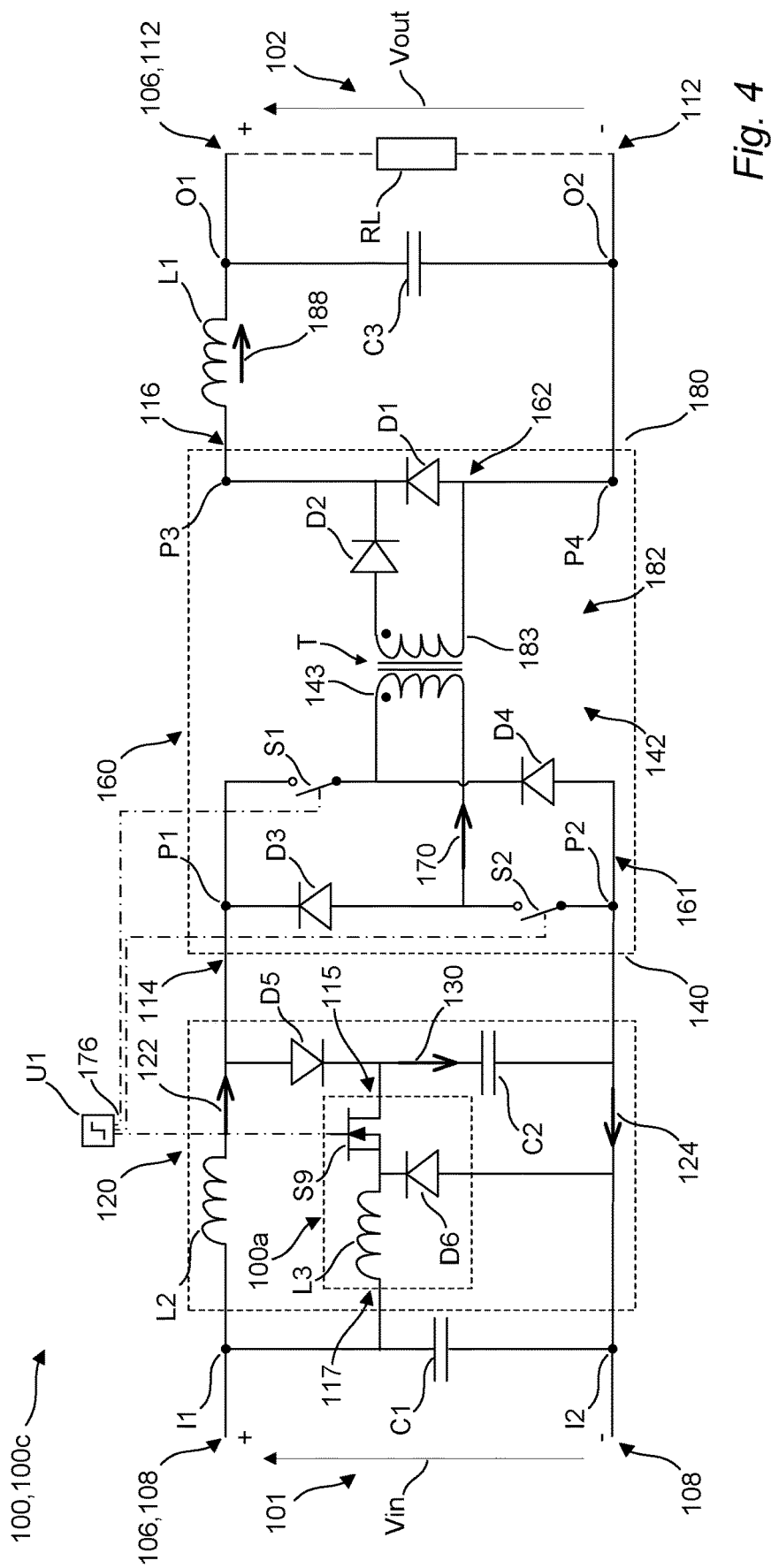
FIG. 4 illustrates an isolated DC-DC power converter according to embodiments of the present disclosure with a single-phase two-switch forward hard-switching circuit.

FIG. 4 is an illustration of an isolated DC-DC power converter 100*c* according to further embodiments of the present disclosure including a hard-switching circuit 160, a soft-switching circuit 120, a first capacitance C1 and a first inductance L1. The hard-switching circuit 160 includes a first switching subcircuit 161 in a single-phase two-switch forward configuration 161. The plurality of semiconducting devices 110 thus comprise two switching element S1-S2 and two rectifying elements D1-D2 arranged in a single-phase forward inverter configuration 161. Additionally, the hard-switching circuit 160 also includes a transformer T having primary windings 143 at a primary side 142 and secondary windings 183 at a secondary side 182, as shown above also. In this example, only two of the plurality of semiconducting devices 110 of the hard-switching circuit 160 are arranged into a rectifying subcircuit 162, i.e., the rectifying subcircuit 162 includes two power diodes D1-D2. The two power diodes D1-D2 of the rectifying subcircuit 162 are arranged with their respective anodes (not shown) coupled to either end of the secondary windings 183, respectively, and with their cathodes (not shown) coupled to the first inductance L1. This similarly provides a substantially rectified output 188 based on a pulse-width modulated output 170.

In this embodiment of the isolated DC-DC power converter 100,100*c*, the controlled discharger F is in the form of a DC-DC step-down converter 100*a*. The DC-DC step-down converter 100*a*, being embedded in the soft-switching circuit 120, includes a second rectifying element D6, a third inductance L3 and a ninth switching element S9 arranged in a "buck" or step-down configuration 100*a* directly coupled between the second capacitance C2 at a high-voltage side 115 and the first capacitance C1 at a low-voltage side 117 of the embedded DC-DC step-down converter 100*a*. This provides that an isolated DC-DC power converter 100,100*c* may be implemented by using conventional electrical components suitable for power electronics, i.e., diodes, MOSFETs, inductors, capacitors, transformers and the like. Additionally, a discharge controller F in the form of a DC-DC step-down converter 100*a* may include only few active electrical components requiring control input 176 to operate, as is for example shown here where only the ninth switching element S9 requires a control signal 176. The power converter 100*c* includes a switching controller U1 providing a control signal 176 to each of the at least a first switching element S1-S2 and to the ninth switching element S9. It is advantageous that a switching controller U1 may thus be provided and "reused" to also selectively activate the embedded DC-DC step-down converter 100a to also act as a discharge controller F, as, e.g., discussed above in relation to FIG. 1, in addition to the switching controller U1 controlling the at least a first switching element S1-S2 of the hard-switching circuit 160. It is furthermore an advantage of the power converter 100,100c including such an embedded DC-DC step-down converter 100a that the embedded DC-DC step-down converter 100a may be implemented cheaply with a power conversion efficiency typically at about 90% using conventional "buck" or step-down topology design techniques, while still providing a solution with improved overall energy efficiency and soft switched turn-on and recovery of turn-on losses in high-power DC-DC power converters 100.

Figure 5:
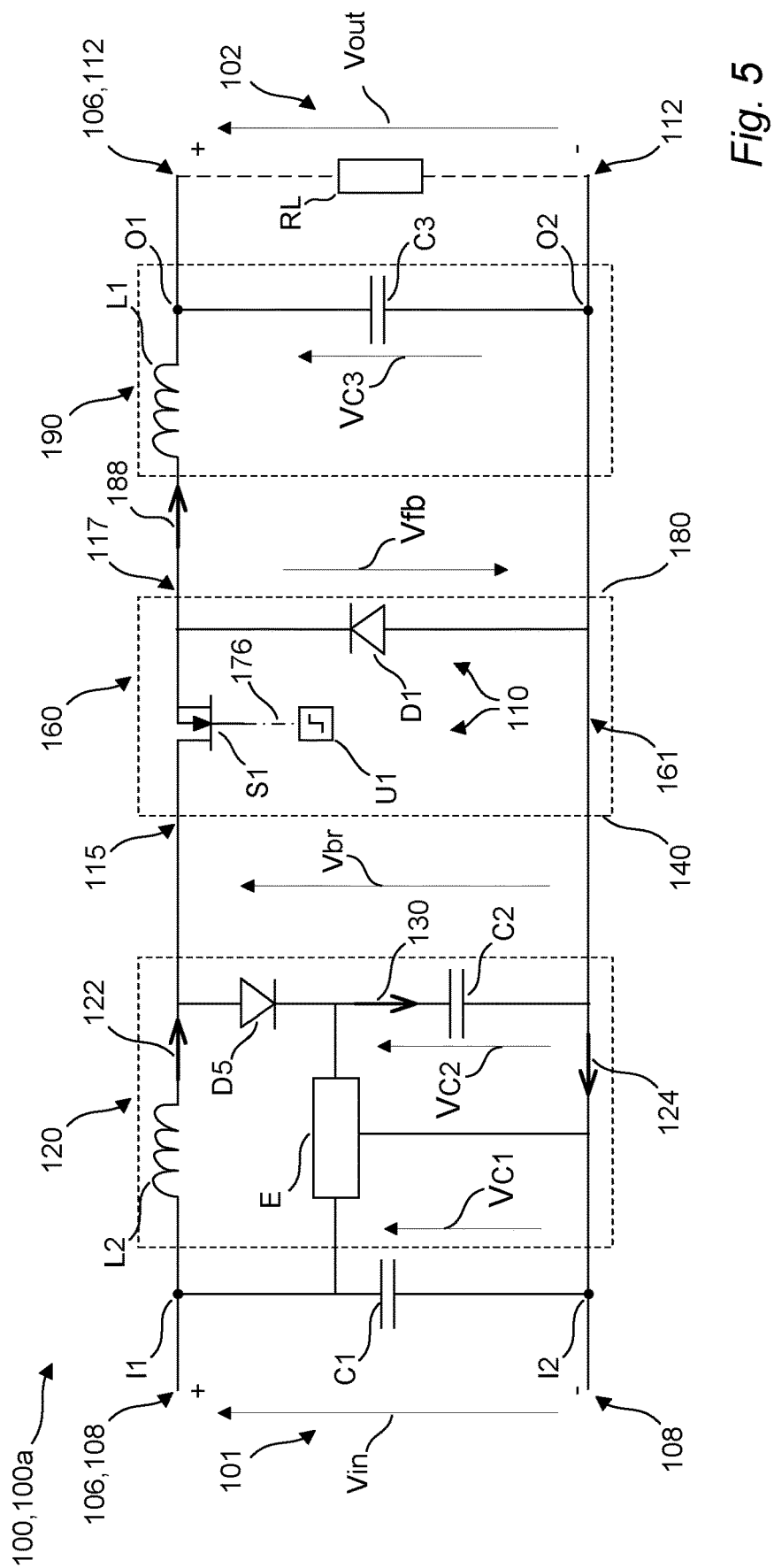
FIG. 5 illustrates a non-isolated DC-DC power converter in a step-down or "buck mode" configuration according to embodiments of the present disclosure.

FIG. 5 is an illustration of a step-down DC-DC power converter 100a in buck configuration according to one embodiment of the present disclosure where the power converter 100,100a includes a hard-switching circuit 160, a soft-switching circuit 120, a first capacitance C1 and a first inductance L1. Compared to an isolated DC-DC power converter 100c for example illustrated in FIG. 2, the primary difference is that the hard-switching circuit 160 shown here is in a non-isolated buck or step-down configuration 100a. The hard-switching circuit 160 includes at least a first switching element S1 in the form of a first power MOSFET S1. The hard-switching circuit 160 also includes one or more rectifying elements D1 in the form of a power diode D1. In this example, the first power MOSFET S1 is a N-channel enhancement type MOSFET with source, drain and gate terminals (not shown), and the cathode (not shown) of the power diode D1 is electrically connected to the source of the first power MOSFET S1. The hard-switching controller 160 is shown also including a switching controller U1 providing a control signal 176 to a gate terminal (not shown) of the first power MOSFET S1 for controlling the opening and closing thereof. In this way, the switching controller U1 may e.g. provide that the hard-switching circuit 160 is transitioned from one mode 118a (not shown) to another mode 118b (not shown) by supplying a gate voltage Vg (not shown) going from high to low representing the first power MOSFET S1 going from an on state 178 (not shown) to an off state 177 (not shown), as discussed in further detail in relation to FIG. 12 below.

The step-down power converter 100a is shown including a hard-switching circuit 160 having a high-voltage side 115 and is configured to receive a DC voltage source 101 at a high-voltage input side 115,140. The hard-switching circuit 160 further has a low-voltage side 117, opposite the high-voltage side 115, and is also configured to then provide a substantially rectified output 188 at a low-voltage output side 117,180 based on receiving said DC voltage source 101 at said input side 140 by operating at least the first switching element S1 by means of the switching controller U1.

The step-down power converter 100,100a is shown including a first capacitance C1 coupled in parallel across the input port 108 at the input side 140 of the hard-switching circuit 160. The step-down power converter 100,100a is further shown including a first inductance L1 coupled in series with the output port 112 and the hard-switching circuit 160 at the low-voltage side 117 of the hard-switching circuit 160 opposite the first capacitance C1. Hereby, its one side 140;180 is a high-voltage side 115 and the second side 180;140 is a low-voltage side 117, wherein a voltage amplitude measured across the high-voltage side 115 exceeds a voltage amplitude measured across the low-voltage side 117.

The high-voltage side 115 and the low-voltage side 117 may be distinguished by a first RMS voltage level V1 (not shown) measured at the input port 106 exceeding a third RMS voltage level V3 (not shown) measured at the output port 112 of the step-down DC-DC power-converter 100a. In other words, relative to the first aspect discussed, here, the one side 140;180 of the hard-switching circuit 160 is the input side 140 and the second side 180;140 is the output side 180. Accordingly, the high-voltage side 115 is at the input side 140 etc.

The hard-switching circuit 160 here includes a plurality of semiconducting devices 110 in the form of the first switching element S1 and the first rectifying element D1, which are coupled to the first inductance L1 and thus electrically connected thereto. The first capacitance C1 is shown coupled between the first input terminal I1 and the second input terminal I2 of the input port 108, and the first inductance L1 is shown coupled between the low-voltage output side 117,180 of the hard-switching circuit 160 and the first output terminal O1 of the output port 112. A third capacitance C3 is shown coupled in parallel across the output port 112 by being coupled between the first output terminal O1 and the second output terminal O2 of the output port 112. A second inductance L2 is shown coupled between the first input terminal I1 and the high-voltage input side 115,140 of the hard-switching circuit 160, whereby a forward current 122 may be driven towards said input side 140 via a bridge voltage Vbr and a substantially rectified output 118 is produced at the output side 180 and directed through a LC filter circuit 190 shown including the first inductance L1 and the third capacitance C3. Hereby, an output voltage Vout is provided as a suitably constant and smooth DC voltage supply 102 with reduced voltage and/or current ripple.

In this embodiment, the soft-switching circuit 120 includes a controlled discharger F in the form of a voltage regulating element E, as for example also shown in FIG. 2. The non-isolated step-down power converter 100a may provide one or more of the advantage as for discussed in relation to in FIGS. 1-4 above, but here not requiring a transformer T and additional switching elements S2-S8 etc., in a solution that allows for a simpler, lighter and cheaper hard-switching circuit 160 with improved efficiency.

Figure 6:
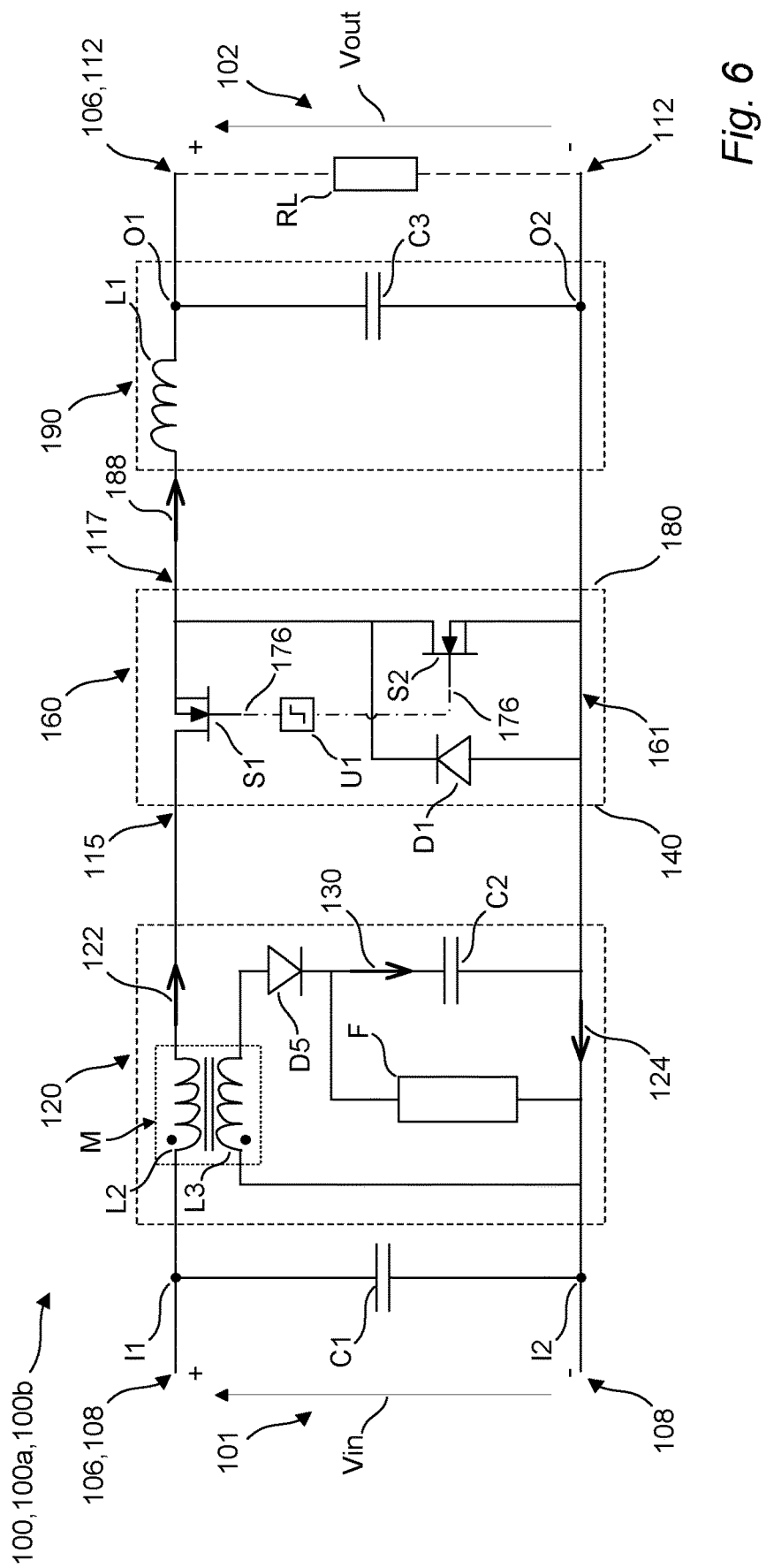
FIG. 6 illustrates a non-isolated DC-DC power converter in a step-down or "buck mode" configuration according to embodiments of the present disclosure where a first rectifying element is coupled to a second inductance via a coupled inductor.

FIG. 6 is an illustration of a bidirectional DC-DC power converter 100a,100b in bidirectional "buck mode" configuration according to another embodiments of the present disclosure where the power converter 100,100a,100b includes a hard-switching circuit 160, a soft-switching circuit 120, a first capacitance C1 and a first inductance L1. The hard-switching circuit 160 is shown including at least a first switching element S1-S2 in the form of a first power MOSFET S1 and a second power MOSFET S2 and one or more rectifying elements D1-D4 in the form of a power diode D1. A switching controller U1 is shown providing control signals 176 to each of the two power MOSFETs S1-S2, whereby the bidirectional DC-DC power converter 100a,100b may be operated to in a buck mode 100 as well as the boost mode 100b. This provides the advantage of a bidirectional power converter 100a-b. In other aspects, the one or more rectifying elements may optionally be omitted.

In this embodiment, the soft-switching circuit 120 includes a first rectifying element D5 coupled to a second inductance L2 via a coupled inductor M which is inductively coupling said second inductance L2 to a third inductance L3. Consequently, the first rectifying element D5 is directly coupled to the third inductance L3 and inductively coupled to the second inductance L2 with galvanic isolation in between. It is evident from this example that changes in a forward current 122 flowing through the second inductance L2 thus produces an induced voltage Vsi (not shown) across the coupled inductor M having primary windings 143 (not shown) with a second inductance L2 and secondary windings 183 (not shown) with a third inductance L3. Thus, the first rectifying element D5 inductively coupled to a second inductance L2 via a coupled inductor M, including the second inductance L2 and the third inductance L3, may also provide forward biasing of the first rectifying element D5 based on an induced voltage Vsi (not shown) across the coupled inductor M e.g. in response to the hard-switching circuit 160 transitioning from one mode 118a to another mode 118b. Thus, a clamped output 130 may be generated to charge the second capacitance C2 also. It may be advantageous that the soft-switching circuit 120 is galvanically isolated.

Figure 7:
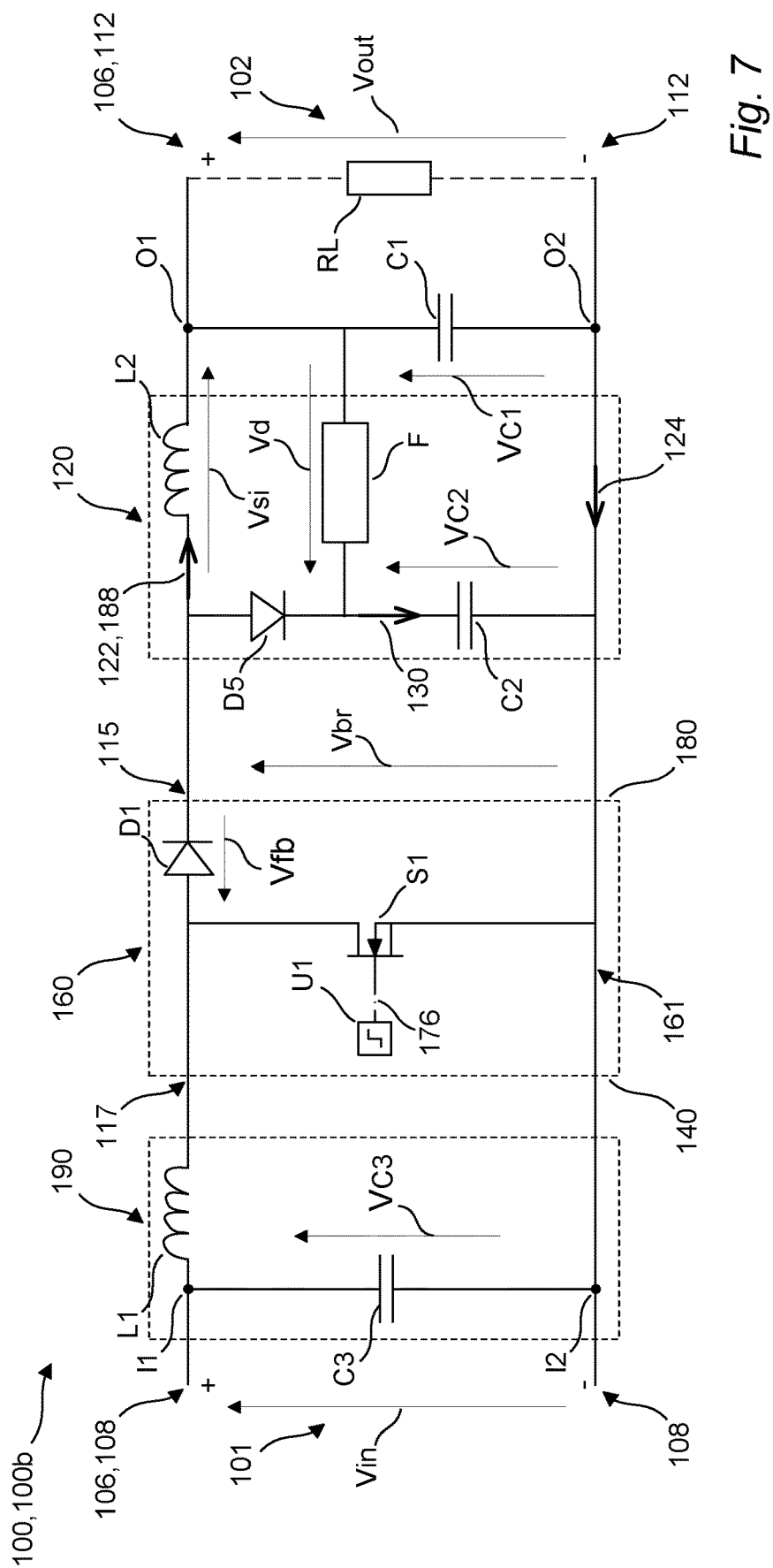
FIG. 7 illustrates a non-isolated DC-DC power converter in a step-up or "boost mode" configuration according to embodiments of the present disclosure.

FIG. 7 is an illustration of a step-up DC-DC power converter 100b in step-up or "boost mode" configuration according to some other embodiments of the present disclosure where the power converter 100,100a includes a hard-switching circuit 160, a soft-switching circuit 120, a first capacitance C1 and a first inductance L1. Compared to an step-down DC-DC power converter 100a for example illustrated in FIG. 6, the primary difference is that the hard-switching circuit 160 shown here is in a non-isolated boost or step-up configuration 100b with the high-voltage side 115 and the low-voltage side 117 switched and/or the at least two power ports 106 switched. The hard-switching circuit 160 includes at least a first switching element S1 in the form of a first power MOSFET S1. The hard-switching circuit 160 includes one or more rectifying elements D1 in the form of a power diode D1. As also discussed in relation to FIG. 6 above, the hard-switching controller 160 is shown with a switching controller U1 providing a control signal 176 to the first power MOSFET S1. The step-up power converter 100b is shown comprising a hard-switching circuit 160 having a low-voltage side 117 and is configured to receive a DC voltage source 101 at a low-voltage input side 117,140. The hard-switching circuit 160 further has a high-voltage side 115, opposite the low-voltage side 117, and is also configured to then provide a substantially rectified output 188 at a high-voltage output side 115,180 based on receiving the DC voltage source 101 at said input side 140 by operating at least the first switching element S1 by means of the switching controller U1.

The step-up power converter 100,100b is shown including a first capacitance C1 coupled in parallel across the output port 112 at the output side 180 of the hard-switching circuit 160. In this example, the step-up power converter 100,100b is also shown including a third capacitance C3 coupled in parallel across the input port 108. The step-up power converter 100,100b is shown including a first inductance L1 coupled in series with the input port 108 and the hard-switching circuit 160 at the low-voltage side 117 of the hard-switching circuit 160 opposite the first capacitance C1. Hereby, the one side 140;180 is a low-voltage side 117 and the second side 180;140 is a high-voltage side 115, wherein a voltage amplitude measured across the high-voltage side 115 exceeds a voltage amplitude measured across the low-voltage side 117. The low-voltage side 117 and the high-voltage side 115 may be distinguished by a first RMS voltage level V1 (not shown) measured at the output port 112 exceeding a third RMS voltage level V3 (not shown) measured at the input port 108 of the step-up DC-DC power-converter 100b. In other words, relative to the first aspect discussed, here, the one side 140;180 of the hard-switching circuit 160 is the output side 180 and the second side 180;140 is the input side 140.

In this embodiment, the soft-switching circuit 120 may direct a substantially rectified output 188 in a forward direction 122 from the output side 180 of the hard-switching circuit 160 to the output port 112 through the second inductance L2. Thus, current may be carried in one direction, such as the forward direction 122, through the first inductance L1 and/or the second inductance L2, i.e. so that unwanted zero-crossing or reversal of said current can be avoided.

The first capacitance C1 is shown coupled between the output terminals O1,O2 and the controlled discharger F is further shown directly coupled between one of the two terminals of the first capacitance C1 and a corresponding one of the two terminals of the second capacitance C2. Optionally, the controlled discharger F may be directly coupled to another of the two terminals of the first capacitance C1, such as e.g. at a return path 124 as also illustrated in FIGS. 2-3 for the voltage regulating element E.

Figure 8A:
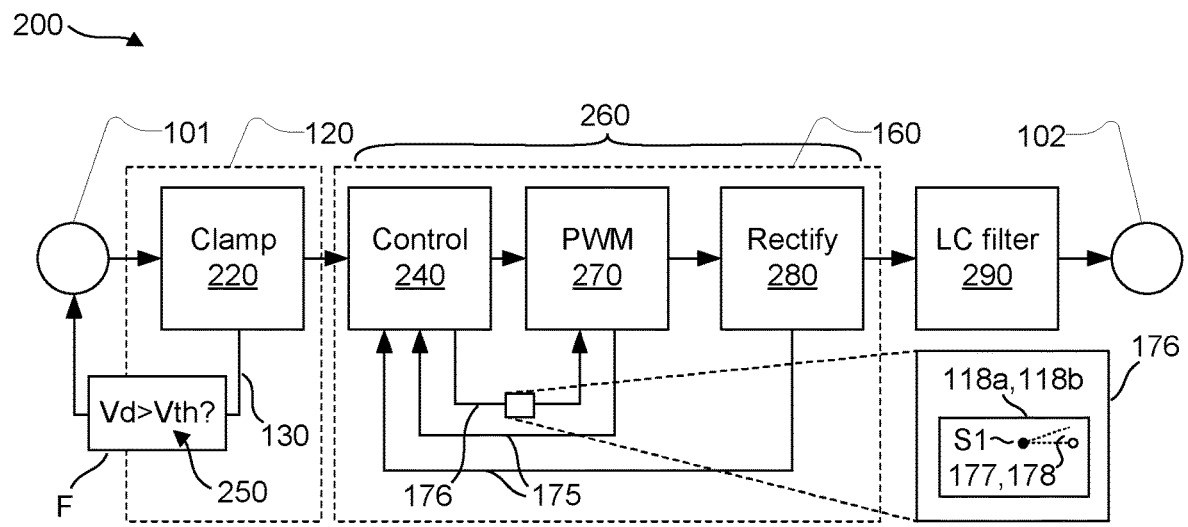
FIG. 8A illustrates a method of operating a pulse-width modulated switch-mode DC-DC power converter for converting a high-power DC input voltage to a high-power DC output voltage according to embodiments of the present disclosure.
Figure 8B:
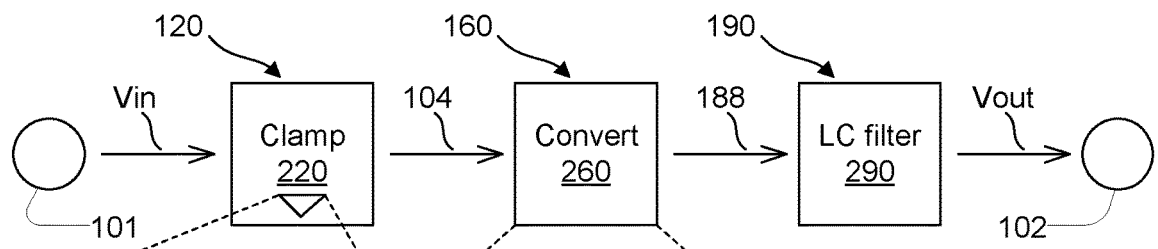
FIG. 8B illustrates a method of converting an input voltage supply to an output voltage supply via a DC-DC power converter via a preconditioned voltage source according to embodiments of the present disclosure.
Figure 8C:
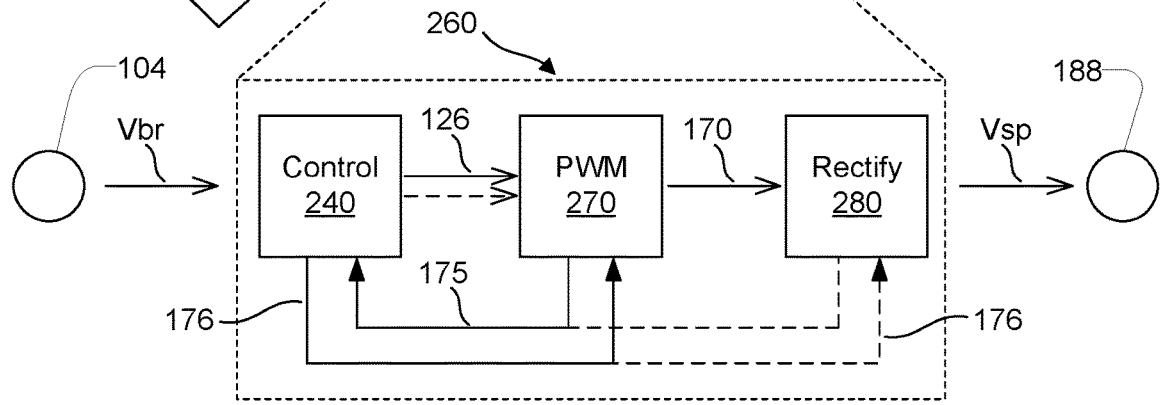
FIG. 8C illustrates a detailed view of a power conversion step of a method, as for example illustrated in FIG. 8B, wherein a preconditioned voltage source is converted to an output voltage supply via a pulse-width modulation stage and a rectifier stage.

FIGS. 8A-C is an illustration of a method 200 of operating a pulse-width modulated switch-mode DC-DC power converter 100,100a-c for converting a high-power DC input voltage 101,Vin to a high-power DC output voltage 102, Vout according to one or more embodiments of the present disclosure. As is shown here, the method 200 includes the steps applying a DC input voltage Vin,101 to the input port 108 of an power converter 100,100a-c according to embodiment of the present disclosure, and converting 260 the DC input voltage Vin,101 to a substantially rectified output 188 at an output side 180 by pulse-width modulation 270. The method 200 is shown further including the steps of rectifying 280 a pulse-width modulated output 170 into the substantially rectified output 188 and filtering 290 the substantially rectified output 188 to supply a DC output voltage Vout,102 to the output port 112.

The DC-DC conversion step 260 is shown also including a step of controlling 240 an opening state 177 or a closing state 178 of the at least a first switching element S1-S8 according to a control signal 176, wherein the control signal 176 is generated representing a mode 118a-b of the hard-switching circuit 160, the mode 118a-b including an opening state 177 or a closing state 178 of at least a first switching element S1-S8. Controlling 240 an opening state 177 or a closing state 178 of the at least a first switching element S1-S8 of the hard-switching circuit 160 is here shown based on sensor signals 175 received from the pulse-width modulation 270 and/or the rectification 280 steps, e.g., measuring a junction current 126, bridge voltage Vbr or the like, for providing pulse-width modulation 270 feedback control 240 so that the DC output voltage Vout,102 may be maintained according to a predetermined set point voltage Vsp despite changes in output load RL (not shown) or the like.

In addition to the method 200 steps 240,260,270,280 being performed via the hard-switching circuit 160 and the step 290 being performed via the LC filter circuit 190, which is understood to further result in a clamped output 130 charging the second capacitance C2, as for example discussed in relation to FIGS. 1-7 above, the method 200 also includes reducing 220 a voltage VC2 across the second capacitance C2 towards a clamp voltage level Vclamp substantially above the voltage VC1 across the first capacitance C1 by activating 250 a controlled discharger F. Here, the step of activating 250 the controlled discharger F is shown to occur when a differential voltage Vd detected between the first capacitance C1 and the second capacitance C2 exceeding a predetermined threshold voltage Vth, as illustrated by "Vd>Vth?".

The clamping step 220 being performed via the soft-switching circuit 120 is shown to provide a preconditioned voltage source 104 to the hard-switching circuit 160, based on the DC input voltage source Vin, 101 for conversion 260 and filtering 290 instead. This may provide the advantage of reducing losses due to reverse recovery of semi-conducting devices 110 (not shown), such as diodes and MOSFETs, while retaining some of the fundamental advantages of hard-switched DC-DC power converter 160, e.g. the inherently low conduction losses associated with hard-switching 260.

Figure 9:
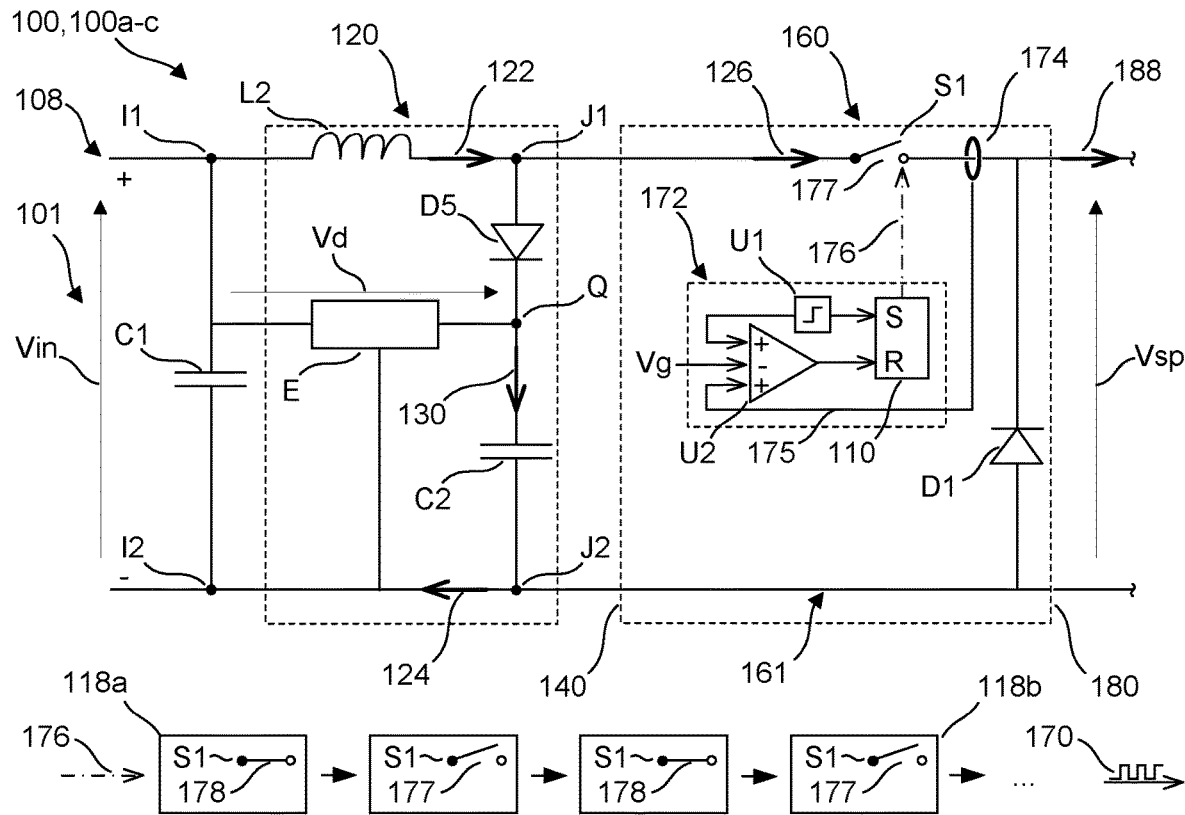
FIG. 9 illustrates a part of a non-isolated DC-DC power converter in a step-down or "buck mode" configuration, as for example illustrated in FIG. 5, with a sensor and a switching regulator controller according to embodiments of the present disclosure.

FIG. 9 is an illustration of soft- and hard-switching parts 120,160 of a non-isolated DC-DC power converter 100,100a in step-down or "buck mode" configuration, as for example illustrated in FIG. 5, with a sensor 174 for sensing a junction current 126 at the at least a first switching element S1 of the hard-switching circuit 160 according to one or more embodiments of the present disclosure. The hard-switching circuit 160 is shown including a switching regulator controller 172 including a switching controller U1, a comparator U2 and a logic-level semiconducting device 110, such as an SR-latch. The switching regulator controller 172 provides that a control signal 176 may be provided to the at least a first switching element S1 to thereby improve controlling an opening state 177 or closing state 178 of the at least a first switching element S1 based on a sensor signal 175 received from the current sensor 174. The control signal 176 is shown to cause the at least a first switching element S1 in the hard-switching circuit 160 (not shown) to transition from one mode 118a to another mode 118b by the at least a first switching element S1 being controlled to alternate between an "off" or opening state 177 and an "on" or closing state 178 to generate a pulse-width modulated output 170. The pulse-width modulated output 170 is being generated by time-proportioning of a duty cycle $t_{ON}/T$ (not shown) of the at least a first switching element S1 to supply a substantially rectified output 188 with average voltage at about a predetermined set point voltage Vsp.

The hard-switching circuit 160 includes a first switching subcircuit 161 coupling the input side 140 and the output side 180. The plurality of semiconducting devices 110 are arranged into the first switching subcircuit 161 further including one or more rectifying elements D1, in addition to the at least a first switching element S1. They are configured for providing a substantially rectified output 188 by the first switching subcircuit 161 being in step-down or "buck mode" configuration 100a, such as by the at least a first switching element S1 opening 177 or closing 178 to generate a pulse-width modulated output 170, the one or more rectifying elements D1 being forward or reverse biased by the pulse-width modulated output 170 to thereby generate the substantially rectified output 188.

In this embodiment, the discharge controller F is shown here in the form of a voltage regulating element E, as for example also discussed in relation to FIG. 5 above. The current sensor 174 is configured for detecting a junction current 126 through at least the first switching element S1 and the voltage regulating element E is configured to receive the sensor signal 175 indicative of the junction current 126 from the current sensor 174 and to regulate the differential voltage Vd based on the sensor signal 175. The sensor signal 175 being received at the voltage regulating element E may allow for improved control of the soft-switching circuit 120. It is contemplated that the switching controller U1 may also be configured to selectively operate a controllable function of the voltage regulating element E based on the pulse-width modulated output 170, such as during reverse biasing of the first rectifying element D5.

Figure 10:
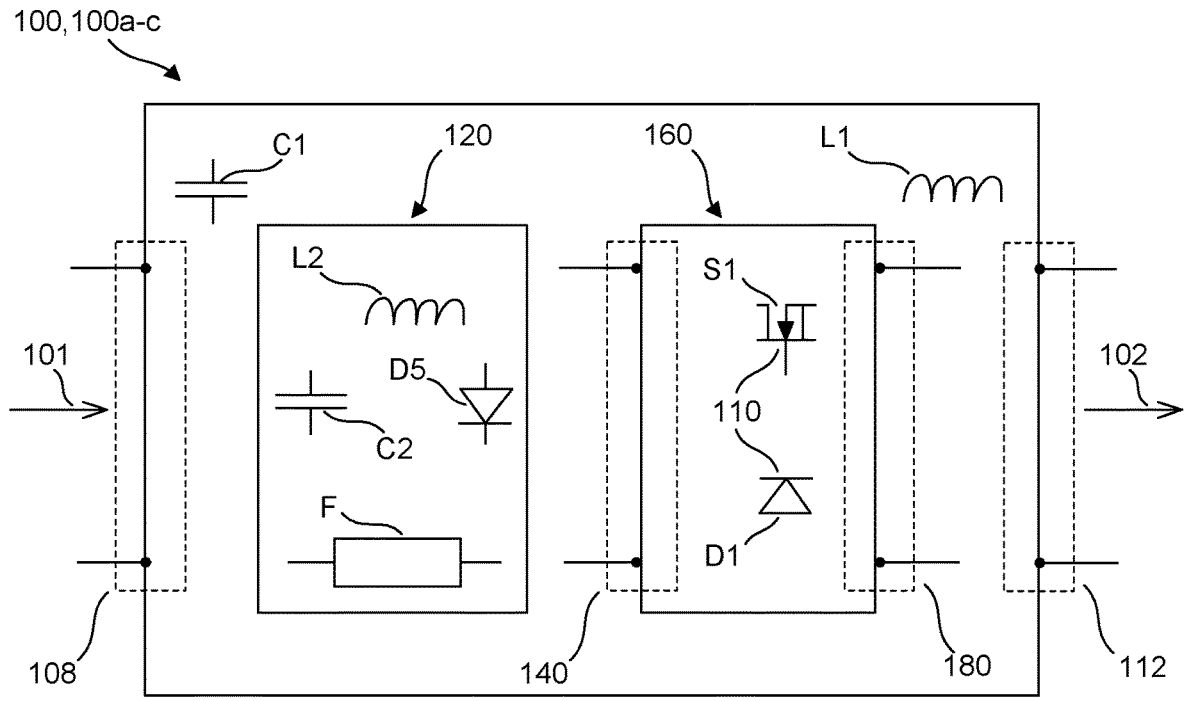
FIG. 10 illustrates elements of a switch-mode DC-DC power converter according to embodiments of the present disclosure and the hierarchical relationships therein.

FIG. 10 is a schematic illustration of the hierarchical relationship of the elements of a switch-mode DC-DC power converter 100,100a-c according to embodiments of the present disclosure. The power converter 100 includes an input port 108 and an output port 112 for receiving a voltage source 101 and providing a voltage supply 102, respectively. Between the ports 108,112 are elements of a first capacitance C1, a first inductance L1, a soft-switching circuit 120 and a hard-switching circuit 160. As shown in various embodiments of the present disclosure illustrated and discussed in relation to FIGS. 1-7 above, these elements may be permute in any number of ways to provide those advantages in a switch-mode DC-DC power converter 100,100a-c. For example, a simple solution may be provided for soft switch turn-on and recovery of turn-on losses in semi-conducting devices, such as power MOSFETS and diodes.

As shown here, the at least a first switching elements S1, the one or more rectifying elements D1 and the first rectifying element D5 are semiconducting devices 110. By both the soft-switching circuit 120 and the hard-switching circuit 160 only including a plurality of components among semi-conducting devices 110, inductors L1,L2 and magnetic components M,T (not shown), no moving or wear-prone parts are needed to generate a DC voltage supply 102 which improves reliability and allows for design of a smaller power converter 100,100a-c. Moreover, as semiconducting devices 110 are generally cheap and offer good electrical conductivity, a DC-DC power converter 100,100a-c using semi-conducting devices 110 may be designed and constructed to simultaneously offer the desirable qualities of low cost and high energy efficiency provided that energy losses relating to switching, reverse recovery and/or charging parasitic capacitances are reduced. This is provided by a soft-switching circuit 120.

Figure 11:
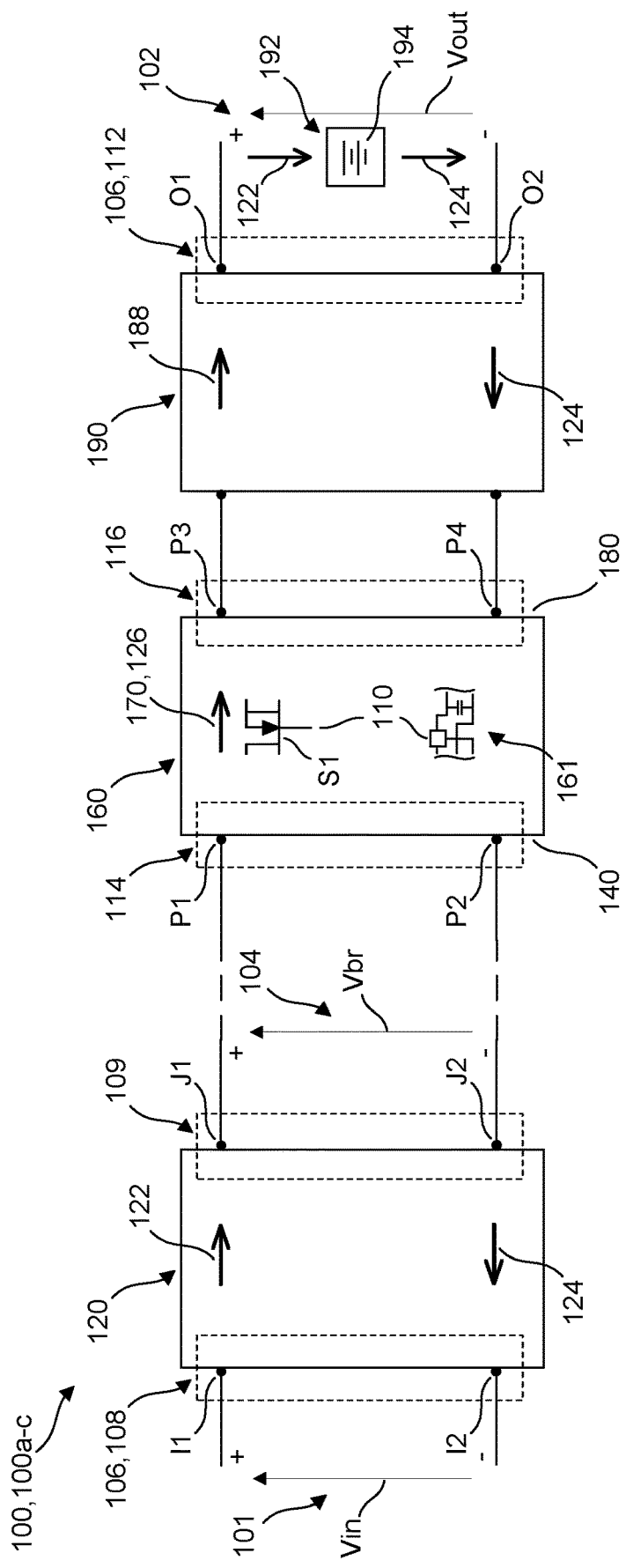
FIG. 11 illustrates a switch-mode power converter for converting a high-power DC voltage with improved energy efficiency by a method according to embodiments of the present disclosure, wherein an input DC voltage is converted to an output DC voltage via soft-switching and hard-switching circuits to charge an electrical battery.

FIG. 11 is an schematic illustration of a switch-mode power converter 100,100a-c for converting a high-power DC voltage Vin, 101 with improved energy efficiency, for example via the method as discussed in relation to FIGS. 8A-C, according to one or more embodiments of the present disclosure, wherein an input DC voltage Vin, 101 is converted to an output DC voltage Vout,102 via a soft-switching circuit 120 and a hard-switching circuit 160 to charge an electrical battery 194, e.g. of a vehicle 192.

The soft-switching circuit 120 is here shown connecting a input power port 106,108 to a voltage port 114 of the hard-switching circuit 160, i.e. directly coupled between the first input terminal I1, the second input terminal I2, the first voltage port junction P1 and the second voltage port junction P2, thus permitting e.g. a forward current 122 from the input port 108 to the voltage port 114 at the hard-switching circuit 160 and returning in the opposite direction 124. Likewise, a substantially rectified output 188 may be driven from the current port 116 to the output port 112, across a load RL (not shown), an electrical battery 194 or the like and then returned 124. As shown in FIGS. 1-4 above, the hard-switching circuit 160 may thus provide improved safety via galvanic isolation between the DC voltage source 101 and the electrical battery 194. Furthermore, the soft-switching circuit 120 is enabled to modify and/or improve the characteristics via preconditioning of a voltage source 104 delivered to the input side 140 of the hard-switching circuit 160. The soft-switching circuit 120 is thus provided and fine-tuned to mitigating some of the detrimental effects of hard-switching the at least the first switching element S1, such as energy losses due to parasitic capacitances, temporal restraints of pulse-width modulation or semiconductor reverse recovery.

Figure 12:
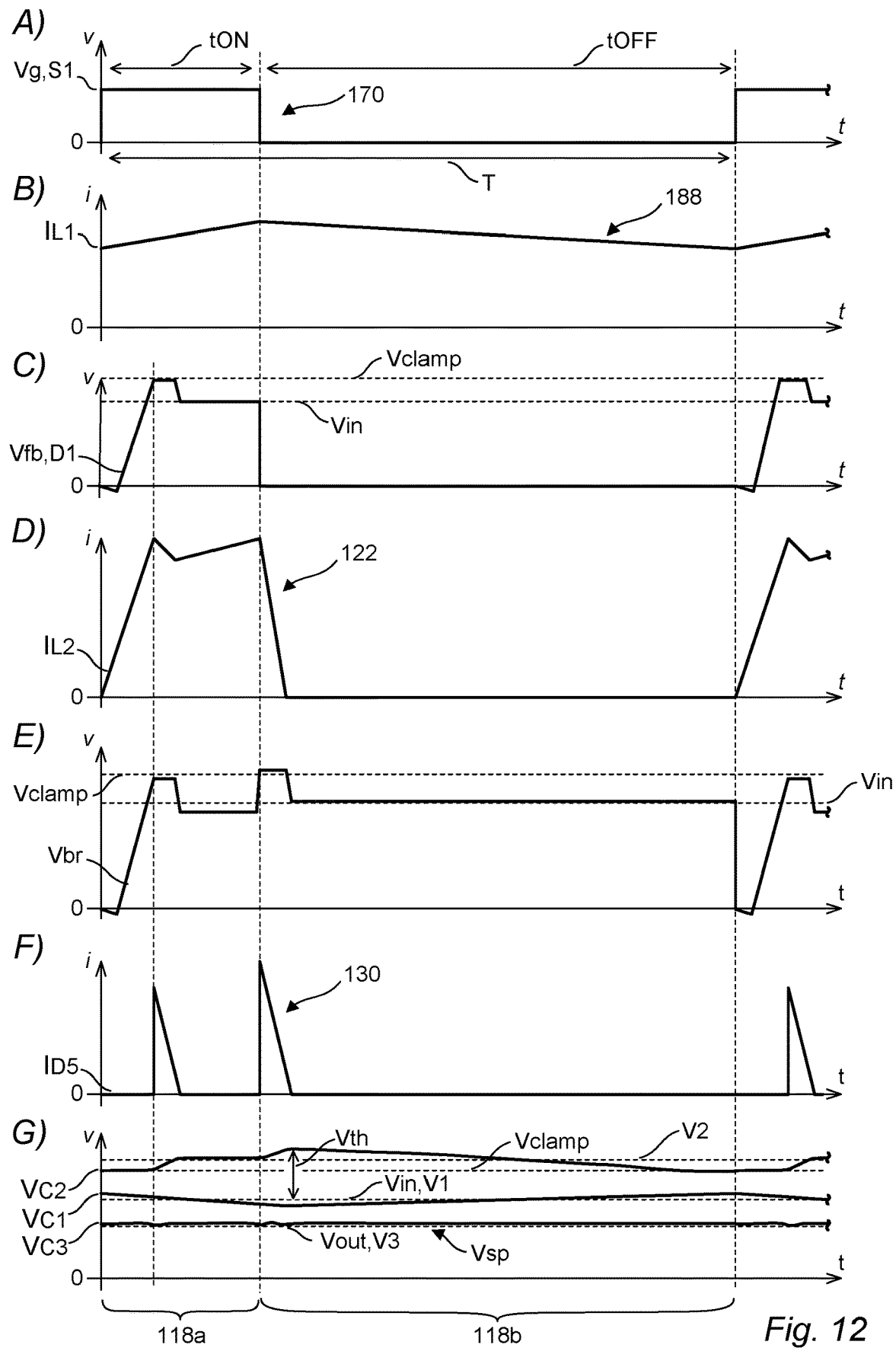
FIG. 12 illustrates hard-switching of voltages and currents in a non-isolated DC-DC power converter in a step-down or "buck mode" configuration, as for example illustrated in FIG. 5, according to embodiments of the present disclosure.

FIG. 12 is an illustration of typical voltages and currents in a non-isolated DC-DC step-down converter 100a in "buck mode" configuration, as for example illustrated in FIG. 5, according to one embodiment of the present disclosure. The seven graphs in FIGS. 12A-G illustrate time-evolution of voltages and currents specifically denoted in FIG. 5 for that embodiment of the step-down converter 100a. Each graph share time axes with the other graphs and graph functions over one pulse repetition interval T.

FIG. 12A shows a gate voltage Vg,S1 applied to the first power MOSFET S1. Here, the first power MOSFET S1 is in a closed or "on" state corresponding to pulse-mode 118a from the start or leftmost side of the interval T until after one pulse width $t_{ON}$. After that, the MOSFET S1 changes to an open or "off" state corresponding to idle-mode 118b until an idle time $t_{OFF}$ passes and the entire pulse train is repeated.

FIG. 12B shows a first inductance current $I_{L1}$ through the first inductance L1. This unidirectional current corresponds to a substantially rectified output current 188.

FIG. 12C shows a forward biasing voltage Vfb,D1 across the power diode D1. At the start or leftmost side of the interval T, the power diode D1 is initially in a conducting state because the first power MOSFET S1 was in an open or "off" state at the end of the prior pulse repetition interval T. At this time, the power diode D1 switches from the conduction state to a blocking state due to a rapidly increasing reverse biasing voltage Vfb,D1 as the MOSFET S1 is closed. For a short time, the power diode D1 is in reverse recovery as stored charge in the power diode D1 is discharged before the diode D1 effectively blocks reverse current, thus causing reverse recovery loss. Then, with the power diode D1 in a blocking state, the biasing voltage Vfb,D1 rises to a clamped voltage level Vclamp substantially above the input voltage V1 due to the bridge voltage Vbr, which is here equal to a sum of the input voltage Vin and the induced voltage Vsi across the second inductance L2, as illustrated in FIG. 12E.

FIG. 12D shows a second inductance current $I_{L2}$ through the second inductance L2. The second inductance current $I_{L2}$ is shown to provide a regenerative effect to limit the forward current 122 when the first power MOSFET S1 is in the closing or "on" state and shortly thereafter. The induced voltage Vsi across the second inductance L2 is proportional to a slope of the second inductance current $I_{L2}$, i.e. changes both sign and magnitude when the first rectifying element D5 of the soft-switching circuit 120 switches from a blocking state to a conducting state due to a voltage drop $V_{C2}$ across the second capacitance C2 exceeding the input voltage Vin, cf. FIG. 12G. As is shown here, the second inductance L2 may help to reduce or rate limit charging of parasitic capacitances within electrical components of the hard-switching circuit 160.

FIG. 12E shows a bridge voltage Vbr across the high-voltage input side 115,140 of the hard-switching circuit 160, as indicated by the voltage arrow Vbr in FIG. 5 above.

FIG. 12F shows a first rectifying element current $I_{D5}$ driven through the first rectifying element D5 of the soft-switching circuit 120. When the first power MOSFET S1 is changed to an opening or "off" state immediately after the pulse width $t_{ON}$, an abrupt fall in the second inductance current $I_{L2}$ shown in FIG. 12D may again cause the first rectifying element D5 to change from a blocking to a conductive state, thus providing a clamped output 130 to charge the second capacitance C2, e.g. as in FIG. 12G.

FIG. 12G shows a first voltage drop VC1 across the first capacitance C1, a second voltage drop $V_{C2}$ across the second capacitance C2 and a third voltage drop $V_{C3}$ across the third capacitance C3, and their respective RMS voltage levels V1-V3.

In this embodiment, the second capacitance C2 charges to a second RMS voltage level V2 substantially above a first RMS voltage level V1 of the first capacitance C1 through the first rectifying element D5, as e.g. discussed in relation to FIG. 5 above. Hereby, the controlled discharger F may be activated when the second voltage drop $V_{C2}$ across the second capacitance C2 exceeds the first voltage drop $V_{C1}$ across the first capacitance C1 by a predefined voltage threshold Vth, thus slowly reducing the voltage $V_{C2}$ across the second capacitance C2 towards a lower voltage clamp level Vclamp substantially above the first voltage drop $V_{C1}$.

As shown in FIG. 12A, a pulse-width modulated output 170 is generated at the first power MOSFET S1 based on the bridge voltage Vbr shown in FIG. 12E by the time-proportioned duty cycle $t_{ON}/T$ where the first power MOSFET S1 is conducting to supply an output voltage Vout according to a predetermined set point voltage Vsp. The switching controller U1 (not shown) is configured to keep a third RMS voltage level V3 of the substantially rectified output 188 (not shown) approximately equal to said predetermined set point voltage Vsp, thus supplying a DC output voltage Vout.

Figure 13:
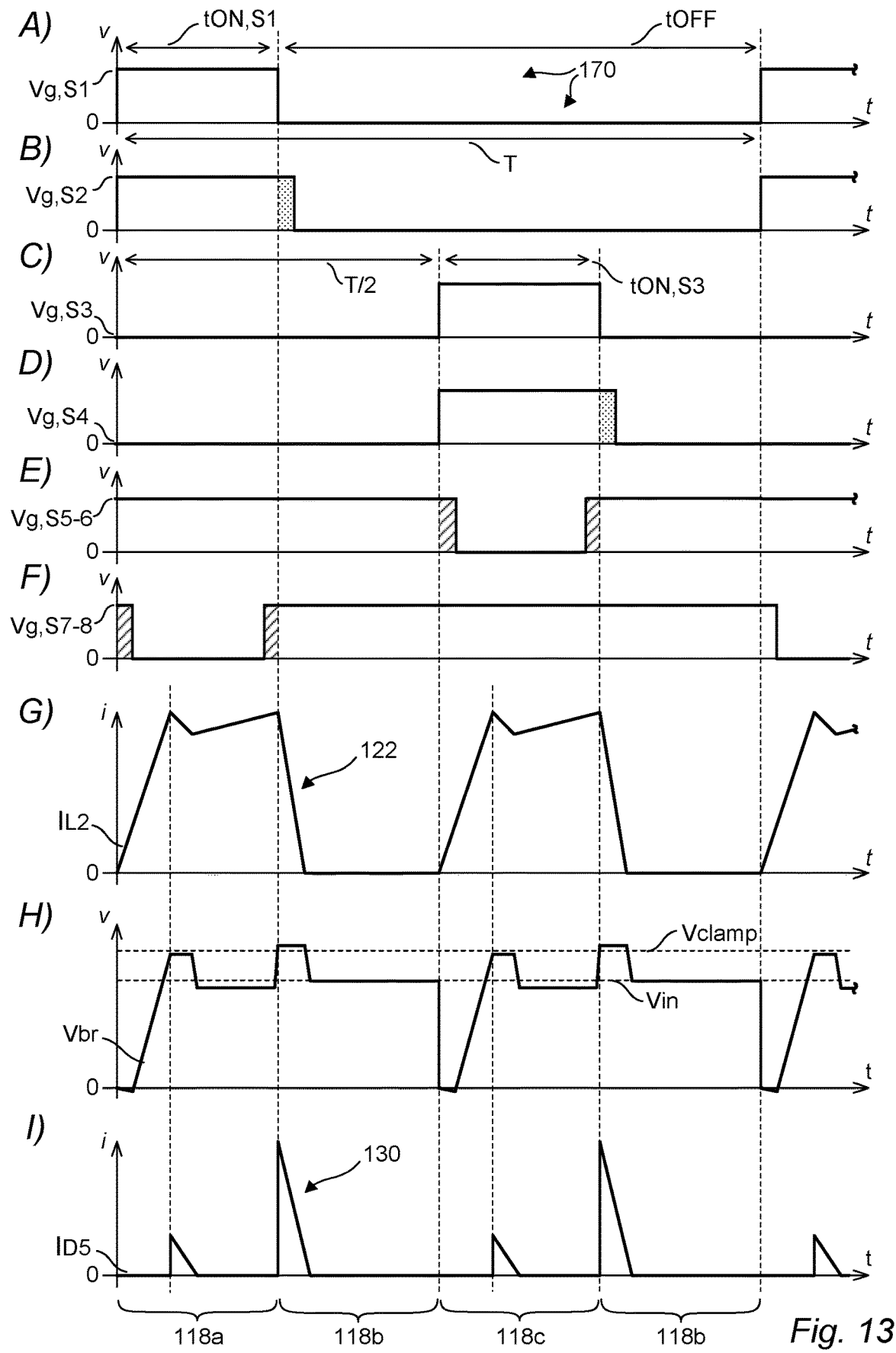
FIG. 13 illustrates hard-switching of voltages and currents in an isolated DC-DC power converter in a full-bridge configuration, as for example illustrated in FIG. 3, including an H-bridge inverter circuit comprising four MOSFETs in a full-bridge configuration and a full-bridge synchronous rectifier including four MOSFETs according to embodiments of the present disclosure.

FIG. 13 illustrates hard-switching of voltages and currents in an isolated DC-DC power converter in a full-bridge configuration, as for example illustrated in FIGS. 1-3, comprising an H-bridge inverter 161 with four power MOSFETs S1-S4 in full-bridge configuration and a full-bridge synchronous rectifier 162,163 with four more power MOSFETs S5-S8 according to embodiments of the present disclosure. The nine graphs in FIGS. 13A-I illustrate time-evolution of voltages and currents specifically denoted in FIG. 1-3 for that embodiment of the isolated converter 100c. Each graph share time axes with the other graphs and illustrate a full pulse repetition interval T.

FIG. 13A shows a first gate voltage Vg,S1 applied to the first power MOSFET S1 in the first switching circuit 161 illustrated in FIGS. 1-3 above. Similarly, FIG. 13B shows a second gate voltage Vg,S2 applied to the second power MOSFET S2, FIG. 13C shows a third gate voltage Vg,S3 applied to the third power MOSFET S3 and FIG. 13D shows a fourth gate voltage Vg,S4 applied to the fourth power MOSFET S4. The dotted/hatched areas shown in FIGS. 13B and 13D illustrate that the "on" time of the second power MOSFET S2 may be slightly longer than a first pulse width $t_{ON,S1}$, so that e.g. pulse-width modulated currents 170 in the primary windings 143 may be allowed to decay after the first power MOSFET S1 is opened before S2 is opened. It is an advantage of a power converter 100 according to the present disclosure that a short-circuit, i.e. the phenomenon known as "shoot-through", may be prevented or at least limited in cases of switching overlap, e.g. where both the first power MOSFET S1 and the fourth power MOSFET S4 are closed, due to the second inductance L2 limiting the forward current 122. This may allow for tight sequencing of pulse trains. By slightly longer may be understood differing in duration substantially less than the pulse repetition interval T, such as differing less than a few nanoseconds.

FIG. 13E shows a fifth and sixth gate voltage Vg,S5-6 applied to both the fifth power MOSFET S5 and the sixth power MOSFET S6 in the synchronous rectifier subcircuit 162,163 illustrated in FIG. 3 above. Similarly, FIG. 13F shows a seventh and eight gate voltage Vg,S7-8 applied to the seventh power MOSFET S7 and eight power MOSFET S8. Thus, the fifth and sixth MOSFETs S5-S6 may be opened and closed together when hard-switching, as are also the seventh and eight MOSFETs S7-S8. In some other aspects, the rectifier subcircuit 162 illustrated in FIGS. 1-2 above may be a synchronous rectifier subcircuit 163 wherein the power diodes D1-D4 therein are replaced with power MOSFETs S5-S8 as shown in FIG. 3, and power MOSFETs S5-S6 and S7-S8 supplied with gate voltages Vg,S5-6 and Vg,S7-8, respectively.

The dotted/hatched area shown in FIG. 13E illustrate that the fifth and sixth power MOSFETs S5-S6 may be closed for a short time during the "on" time $t_{ON,S3}$ where the seventh and eight power MOSFETs S5-S6 are closed; and FIG. 13F vice versa. Widths of the dotted/hatched area are shown exaggerated for illustration purposes.

FIG. 13G shows a second inductance current $I_{L2}$ through the second inductance L2.

FIG. 13H shows a bridge voltage Vbr across the current port 114 at the input side 140 of the hard-switching circuit 160, as indicated by the voltage arrow Vbr in FIG. 1. The bridge voltage Vbr may be denoted analogously for FIGS. 2-3, although in FIG. 3, the bridge voltage Vbr illustrated here corresponds to voltage Vbr across the voltage port 114 of the H-bridge inverter configuration 161 i.e. shorting the first voltage port junction P1 and the another voltage port junction P1' in FIG. 3 as discussed above.

FIG. 13I shows a first rectifying element current $I_{D5}$ driven through the first rectifying element D5 of the soft-switching circuit 120. Here, a clamped output 130 is shown contributing to the charging of the second capacitance C2 twice as often during the pulse repetition interval T compared to the equivalent graph in FIG. 12F.

REFERENCES

100 Switch-mode DC-DC power converter
100a Step-down DC-DC converter (buck topology)
100b Step-up DC-DC converter (boost topology)
100c Isolated DC-DC converter
101 DC voltage source
102 DC voltage supply
104 Preconditioned voltage source
106 Power port
108 Input port
109 Preconditioned port
110 Semiconducting device
112 Output port
114 Voltage port
115 High-voltage side
116 Current port
117 Low-voltage side
118a-c Mode
120 Soft-switching circuit
122 Forward current direction
124 Return path
126 Junction current
130 Clamped output
140 Input side
142 Primary side
143 Primary windings
150 Magnetic flux
160 Hard-switching circuit
161 First switching subcircuit
162 Rectifying subcircuit
163 Second switching subcircuit
170 Pulse-width modulated output
172 Switching regulator controller
174 Current sensor
175 Sensor signal
176 Control signal
177 Opening state
178 Closing state
180 Output side
182 Secondary side
183 Secondary windings
184 Center-tapped wire
185 Tertiary windings
188 Rectified output
190 LC filter circuit
192 Electric vehicle
194 Electrical battery
200 Method
220 Maintaining
240 Controlling
250 Discharging
260 Power conversion
270 Pulse-width modulation
280 Rectification
290 Filtering
C1-C3 Capacitance
D1-D6 Rectifying element
E Voltage regulating element
F Controlled discharger
I1,I2 Input terminal
$I_{D5}$ First rectifying element current
$I_{L1}$ First inductance current
$I_{L2}$ Second inductance current
J1,J2 Preconditioned terminal
L1-L3 Inductance
M Coupled inductance
N1-N4 Node
O1,O2 Output terminal
P1,P2 Voltage port junction
P3,P4 Current port junction
Q Regulator probe point
RL Output load
S1-S9 Switching element
T Transformer
$t_{ON}$ Pulse width or "on" time
$t_{OFF}$ Idle or "off" time
T Pulse repetition interval
U1 Switching controller
U2 Comparator
V1-V3 RMS voltage level
$V_{C1-C3}$ Capacitor voltage
Vbr Bridge voltage
Vclamp Clamp voltage
Vd Differential voltage
Vin Input voltage
Vfb Forward bias voltage
Vg Gating voltage
Vout Output voltage
Vsi Induced voltage
Vsp Set point voltage
Vth Threshold voltage

The invention claimed is:

1. A switch-mode DC-DC power converter comprising:
at least two power ports comprising an input port and an output port;
a hard-switching circuit comprising a plurality of semiconducting devices comprising at least a first switching element, the hard-switching circuit configured to receive a DC voltage source at an input side and to provide a substantially rectified output at an output side;
a first capacitance coupled in parallel across one of the at least two power ports at one side of the hard-switching circuit;
a first inductance coupled in series with another of the at least two power ports and the hard-switching circuit at a second side of the hard-switching circuit opposite the first capacitance;
a soft-switching circuit comprising:
a second capacitance;
a second inductance coupled to the first capacitance and to at least one of the plurality of semiconducting devices;
a first rectifying element coupled to the second inductance and the second capacitance to charge the second capacitance by forward biasing the first rectifying element based on an induced voltage across the second inductance-in response to the hard-switching circuit transitioning from one mode to another mode;
a controlled discharger coupled to the second capacitance to reduce a voltage across the second capacitance towards a voltage level substantially above the voltage across the first capacitance; and
wherein the first inductance is high-impedance compared to the second inductance, as measurable by the first inductance having an electrical inductance substantially greater than the electrical inductance of the second inductance.

2. The power converter according to 1, wherein the hard-switching circuit is configured to repeatedly alternate between switching modes.

3. The power converter according to claim 1, wherein the one side is a high-voltage side and the second side is a low-voltage side, wherein a voltage amplitude measured across the high-voltage side exceeds a voltage amplitude measured across the low-voltage side.

4. The power converter according to claim 1, wherein current is carried in one direction through the first inductance and/or the second inductance.

5. The power converter according to claim 1, wherein the second capacitance and the first rectifying element are arranged in series to each other and together coupled in parallel to the one side of the hard-switching circuit.

6. The power converter according to claim 1, wherein the controlled discharger is directly coupled to one terminal of the first capacitance and to a corresponding terminal of the second capacitance.

7. The power converter according to claim 1, wherein the controlled discharger is a voltage regulating element configured to receive and regulate a differential voltage between the first capacitance and the second capacitance, said differential voltage being substantially less than an input voltage applied by the DC voltage source.

8. The power converter according to claim 7, wherein the voltage regulating element is coupled between the first capacitance and the second capacitance to discharge the second capacitance into the first capacitance.

9. The power converter according to claim 7, wherein the hard-switching circuit further comprises a current sensor configured for detecting a junction current through at least the first switching element and wherein the voltage regulating element is further configured to receive a sensor signal indicative of the junction current from the current sensor and to regulate the differential voltage based on the sensor signal.

10. The power converter according to claim 1, wherein the controlled discharger is a DC-DC step-down converter.

11. The power converter according to claim 1, wherein the second capacitance charges to a second RMS voltage level substantially above a first RMS voltage level of the first capacitance through the first rectifying element.

12. The power converter according to claim 1, wherein the hard-switching circuit comprises two or more rectifying elements arranged into a rectifier subcircuit.

13. The power converter according to claim 1, wherein the plurality of semiconducting devices of the hard-switching circuit further comprise one or more rectifying elements coupled to the first inductance.

14. The power converter according to claim 4, wherein the hard-switching circuit comprises:
a switching controller configured to selectively operate at least the first switching element to generate a pulse-width modulated output.

15. The power converter according to claim 14, wherein the pulse-width modulated output is generated by time-proportioning a duty cycle of the at least a first switching element to supply a predetermined set point voltage.

16. The power converter according to claim 15, wherein the switching controller is further configured to keep an RMS voltage level of the substantially rectified output provided at the output side approximately equal to the predetermined set point voltage.

17. The power converter according to claim 1, wherein the hard-switching circuit is configured to establish a voltage port across a first voltage port junction and a second voltage port junction provided at the input side of the hard-switching circuit.

18. The power converter according to claim 17, wherein one set of the plurality of semiconducting devices of the hard-switching circuit are arranged into at least a first switching subcircuit coupled to the first voltage port junction and the second voltage port junction and comprising one or more switching elements including the at least a first switching element.

19. The power converter according to claim 18, wherein another set of the plurality of semiconducting devices of the hard-switching circuit are arranged into a rectifying subcircuit, and wherein the hard-switching circuit comprises a transformer having primary windings and secondary windings that inductively couple the first switching subcircuit and the rectifying subcircuit in response to a magnetic flux therein between.

20. The power converter according to claim 17, wherein the hard-switching circuit comprises of a transformer having primary windings and secondary windings, wherein the at least a first switching element is coupled between a first node point and the first voltage port junction and wherein the first switching subcircuit comprises:
a second switching element coupled between the second voltage port junction and a second node point;
a third switching element coupled between the second node point and the voltage port junction; and
a fourth switching element coupled between the second voltage port junction and the first node point;
wherein the first node point and second node point are coupled to the primary windings so that magnetic flux is generated at a primary side of the transformer based on the hard-switching circuit transitioning from one mode to another mode.

21. The power converter according to claim 1, wherein the hard-switching circuit is configured to establish a current port across a first current port junction and a second current port junction provided at the output side of the hard-switching circuit.

22. The power converter according to claim 21, wherein the hard-switching circuit comprises two or more switching elements coupled to the current port junctions.

23. The power converter according to claim 1, wherein the hard-switching circuit comprises a first switching subcircuit coupling the input side and the output side, wherein the plurality of semiconducting devices are arranged into said first switching subcircuit further comprising:
one or more rectifying elements configured for providing a substantially rectified output.

24. The power converter according to claim 1, wherein the power converter is a non-isolated DC-DC power converter.

25. The power converter according to claim 24, wherein the one side of the hard-switching circuit is the output side and the second side is the input side.

26. The power converter according to claim 24, wherein the one side of the hard-switching circuit is the input side and the second side is the output side.

27. The power converter according to claim 1, wherein the hard-switching circuit is according to one or more of the following switch-mode topologies:
A. a step-down or "buck" topology,
B. a step-up or "boost" topology,
C. a buck-boost topology,
D. a split-pi topology,
or any combination of the above.

28. The power converter according to claim 1, wherein the power converter is an isolated DC-DC power converter.

29. The power converter according to claim 1, wherein the hard-switching circuit is according to one or more of the following switch-mode topologies:
A. a push-pull topology,
B. a half-bridge topology,
C. a full-bridge topology,
D. a current-doubler topology,
E. a two-switch forward topology,
F. a resonant, zero-voltage switch topology,
or any combination of the above.

30. The power converter according to claim 1, wherein the power converter further comprises:
a third capacitance coupled in parallel across the another of the at least two power ports at the second side of the hard-switching circuit opposite the first capacitance.

31. The power converter according to claim 1, wherein the first capacitance is low-impedance compared to the second capacitance, as measurable by the first capacitance having an electrical capacitance being substantially greater than the electrical capacitance of the second capacitance.

32. A method of operating a switch-mode DC-DC power converter for converting a high-power DC voltage in a power converter comprising:
at least two power ports comprising an input port and an output port;
a hard-switching circuit comprising a plurality of semiconducting devices comprising at least a first switching element, the hard-switching circuit configured to receive a DC voltage source at an input side and to provide a substantially rectified output at an output side;
a first capacitance coupled in parallel across one of the at least two power ports at one side of the hard-switching circuit;
a first inductance coupled in series with another of the at least two power ports and the hard-switching circuit at a second side of the hard-switching circuit opposite the first capacitance;
a soft-switching circuit comprising:
a second capacitance;
a second inductance coupled to the first capacitance and to at least one of the plurality of semiconducting devices;
a first rectifying element coupled to the second inductance and the second capacitance to charge the second capacitance by forward biasing the first rectifying element based on an induced voltage across the second inductance in response to the hard-switching circuit transitioning from one mode to another mode;
a controlled discharger coupled to the second capacitance to reduce a voltage across the second capacitance towards a voltage level substantially above the voltage across the first capacitance; and
wherein the first inductance is high-impedance compared to the second inductance, as measurable by the first inductance having an electrical inductance substantially greater than the electrical inductance of the second inductance;
wherein the method comprises:
applying a DC input voltage to the input port;
generating a control signal representing a mode of the hard-switching circuit, the mode comprising an opening state or a closing state of at least a first switching element;
controlling an opening state or a closing state of the at least a first switching element according to the control signal;
converting the DC input voltage to provide a substantially rectified output at an output side by pulse-width modulation; and
reducing a voltage across the second capacitance towards a clamp voltage level substantially above the voltage across the first capacitance by activating the controlled discharger.

33. The method according to claim 32, wherein the method comprises:
detecting a differential voltage between the first capacitance and the second capacitance; and
selectively activating the controlled discharger based on the detected differential voltage exceeding a predetermined threshold voltage.

34. The method according to claim 32, wherein the method further comprises:
filtering the substantially rectified output to supply a DC output voltage at a predetermined set point voltage to output port.

35. Use of a switch-mode DC-DC power converter, wherein the switch-mode DC-DC power converter comprises:
at least two power ports comprising an input port and an output port;
a hard-switching circuit comprising a plurality of semiconducting devices comprising at least a first switching element, the hard-switching circuit configured to receive a DC voltage source at an input side and to provide a substantially rectified output at an output side;
a first capacitance coupled in parallel across one of the at least two power ports at one side of the hard-switching circuit;

a first inductance coupled in series with another of the at least two power ports and the hard-switching circuit at a second side of the hard-switching circuit opposite the first capacitance;
a soft-switching circuit comprising:
  a second capacitance;
  a second inductance coupled to the first capacitance and to at least one of the plurality of semiconducting devices;
  a first rectifying element coupled to the second inductance and the second capacitance to charge the second capacitance by forward biasing the first rectifying element based on an induced voltage across the second inductance in response to the hard-switching circuit transitioning from one mode to another mode;
  a controlled discharger coupled to the second capacitance to reduce a voltage across the second capacitance towards a voltage level substantially above the voltage across the first capacitance; and
wherein the first inductance is high-impedance compared to the second inductance, as measurable by the first inductance having an electrical inductance substantially greater than the electrical inductance of the second inductance;
wherein the use of the switch-mode DC-DC power converter comprises:
  providing a DC voltage supply to charge an electrical battery.

36. A switch-mode DC-DC power converter comprising:
at least two power ports comprising an input port and an output port;
a hard-switching circuit comprising a plurality of semiconducting devices comprising at least a first switching element, the hard-switching circuit configured to receive a DC voltage source at an input side and to provide a substantially rectified output at an output side;
a first capacitance coupled in parallel across one of the at least two power ports at one side of the hard-switching circuit;
a first inductance coupled in series with another of the at least two power ports and the hard-switching circuit at a second side of the hard-switching circuit opposite the first capacitance;
a soft-switching circuit comprising:
  a second inductance coupled to the first capacitance and to at least one of the plurality of semiconducting devices; and
  a first rectifying element coupled to the second inductance to clamp the second inductance by forward biasing the first rectifying element based on an induced voltage across the second inductance in response to the hard-switching circuit transitioning from one mode to another mode;
wherein the second inductance is a clamped inductive element; and
wherein the first inductance is high-impedance compared to the second inductance, as measurable by the first inductance having an electrical inductance substantially greater than the electrical inductance of the second inductance.

* * * * *